(12) United States Patent
Mahaffey, Jr. et al.

(10) Patent No.: US 12,480,263 B2
(45) Date of Patent: Nov. 25, 2025

(54) MATERIAL REMOVAL MANUFACTURE, ASSEMBLY, AND METHOD OF ASSEMBLY

(71) Applicant: Dynatech Systems, Inc., Elyria, OH (US)

(72) Inventors: Glenn Mahaffey, Jr., Elyria, OH (US); Ronald Nealey, Collins, OH (US)

(73) Assignee: Dynatech Systems, Inc., Elyria, OH (US)

( * ) Notice: Subject to any disclaimer, the term of this patent is extended or adjusted under 35 U.S.C. 154(b) by 0 days.

(21) Appl. No.: 17/591,330

(22) Filed: Feb. 2, 2022

(65) Prior Publication Data

US 2022/0195675 A1    Jun. 23, 2022

Related U.S. Application Data

(63) Continuation of application No. 16/198,359, filed on Nov. 21, 2018, now Pat. No. 11,268,249.
(Continued)

(51) Int. Cl.
*B28D 1/18* (2006.01)
*E01C 23/088* (2006.01)
(Continued)

(52) U.S. Cl.
CPC .......... *E01C 23/088* (2013.01); *E01C 23/127* (2013.01); *B28D 1/188* (2013.01);
(Continued)

(58) Field of Classification Search
CPC ............. E01C 23/0933; E01C 23/0946; E01C 23/0993; E01C 23/088; E01C 23/127;
(Continued)

(56) References Cited

U.S. PATENT DOCUMENTS 1,984,936 A    12/1934 Larsson
2,104,822 A    1/1938 Scott
(Continued)

FOREIGN PATENT DOCUMENTS

CA    2123028    11/1994
CN    102296522    12/2011
(Continued)

OTHER PUBLICATIONS

Extended European Search Report and Search Opinion issued by the European Patent Office for European Patent Application No. 18882225.8 dated Jul. 16, 2021, 12 pages.
(Continued)

*Primary Examiner* — Janine M Kreck
(74) *Attorney, Agent, or Firm* — McDonald Hopkins LLC

(57) ABSTRACT

Milling-drumless products, systems, manufactures, and methods for removing material, such as concrete or asphalt, and a system and method of assembling material removal (for example, grinding and/or cutting) blade elements, or blade elements and spacers, to fabricate a configuration that eliminates a need for a large milling drum are provided. The method allows the configuration to be adjusted easily in a field situation to most any material removal width by exchanging, adding or subtracting blade elements and/or spacers.

23 Claims, 30 Drawing Sheets

Related U.S. Application Data

(60) Provisional application No. 62/590,724, filed on Nov. 27, 2017, provisional application No. 62/590,727, filed on Nov. 27, 2017.

(51) Int. Cl.
  *E01C 23/09* (2006.01)
  *E01C 23/12* (2006.01)

(52) U.S. Cl.
  CPC ...... *E01C 23/0933* (2013.01); *E01C 23/0946* (2013.01); *E01C 23/0993* (2013.01)

(58) Field of Classification Search
  CPC ..... E01C 23/0926; E04G 23/006; B28D 1/04; B28D 1/041; B28D 1/045; B28D 1/048; B28D 1/186; B28D 1/188; B28D 1/24
  See application file for complete search history.

(56) References Cited

U.S. PATENT DOCUMENTS

| | | | |
|---|---|---|---|
| 2,349,949 A * | 5/1944 | Farrell | E01C 23/0946 404/94 |
| 3,376,673 A | 4/1968 | Metzger et al. | |
| 3,468,583 A | 9/1969 | Austin | |
| 3,585,761 A * | 6/1971 | Hughes | B27B 5/34 451/544 |
| 3,612,611 A | 10/1971 | Ellis | |
| 3,779,607 A | 12/1973 | Staab | |
| 4,040,668 A | 8/1977 | Fairweather et al. | |
| 4,463,989 A * | 8/1984 | Kennedy | B28D 1/186 299/39.4 |
| 4,690,691 A | 9/1987 | Komanduri | |
| 4,702,649 A | 10/1987 | Komanduri | |
| 4,714,385 A | 12/1987 | Komanduri | |
| 4,797,138 A | 1/1989 | Komanduri | |
| D317,010 S | 5/1991 | Knemeyer | |
| 5,083,839 A | 1/1992 | Younger | |
| 5,127,588 A | 7/1992 | Schmidt | |
| D330,206 S | 10/1992 | Slutz | |
| 5,271,696 A | 12/1993 | Stock | |
| D357,485 S | 4/1995 | Mattsson et al. | |
| 5,464,163 A | 11/1995 | Zoz | |
| 5,733,074 A | 3/1998 | Stock et al. | |
| 5,869,512 A | 2/1999 | Napoletano | |
| 6,390,086 B1 | 5/2002 | Collins | |
| 6,450,738 B1 | 9/2002 | Ripley | |
| D502,952 S | 3/2005 | Achilles et al. | |
| 7,223,049 B2 | 5/2007 | Hall et al. | |
| D554,162 S | 10/2007 | Hall et al. | |
| 7,287,818 B1 | 10/2007 | Hall et al. | |
| D558,241 S | 12/2007 | Chiang | |
| D558,242 S | 12/2007 | Chiang | |
| 7,320,505 B1 | 1/2008 | Hall et al. | |
| 7,384,105 B2 | 6/2008 | Hall et al. | |
| 7,387,464 B2 | 6/2008 | Hall et al. | |
| 7,396,085 B2 | 7/2008 | Hall et al. | |
| 7,445,294 B2 | 11/2008 | Hall et al. | |
| 7,469,972 B2 | 12/2008 | Hall et al. | |
| 7,553,344 B2 | 6/2009 | Cho | |
| 7,588,102 B2 | 9/2009 | Hall et al. | |
| 7,665,552 B2 | 2/2010 | Hall et al. | |
| 7,926,597 B2 | 4/2011 | Majagi et al. | |
| 8,365,845 B2 | 2/2013 | Hall et al. | |
| 8,590,643 B2 | 11/2013 | Smallman et al. | |
| 8,960,337 B2 | 2/2015 | Hall et al. | |
| 9,238,893 B2 | 1/2016 | Latham | |
| 9,631,490 B2 | 4/2017 | Latham | |
| D798,350 S | 9/2017 | Weaver | |
| D798,920 S | 10/2017 | Weaver | |
| D809,031 S | 1/2018 | Burton | |
| 10,239,184 B2 | 3/2019 | Axinte et al. | |
| 10,260,206 B2 | 4/2019 | Latham | |
| 10,323,514 B2 | 6/2019 | Burton | |
| 10,408,057 B1 | 9/2019 | Myers et al. | |
| 10,414,069 B2 | 9/2019 | Miess et al. | |
| 10,465,512 B2 | 11/2019 | Kenno et al. | |
| 10,590,632 B2 | 3/2020 | Parzynski et al. | |
| 10,648,330 B1 | 5/2020 | Weaver et al. | |
| 10,787,784 B2 | 9/2020 | Schletzbaum | |
| 11,052,400 B2 | 7/2021 | Dallimore et al. | |
| 11,408,135 B2 | 8/2022 | Latham | |
| 11,585,215 B2 | 2/2023 | Burton et al. | |
| 2003/0025334 A1 | 2/2003 | McDavid | |
| 2003/0062760 A1 | 4/2003 | Wyser | |
| 2003/0155155 A1 | 8/2003 | Dewey et al. | |
| 2004/0143897 A1 | 7/2004 | Kollmann | |
| 2004/0155131 A1 | 8/2004 | Bardos | |
| 2005/0040263 A1 | 2/2005 | Parke | |
| 2005/0164620 A1 | 7/2005 | Amamoto | |
| 2007/0192112 A1 | 8/2007 | Hall | |
| 2008/0009232 A1 | 1/2008 | Thysell | |
| 2008/0250724 A1 | 10/2008 | Hall et al. | |
| 2010/0242375 A1 | 9/2010 | Hall et al. | |
| 2010/0244545 A1 | 9/2010 | Hall et al. | |
| 2010/0299285 A1 | 11/2010 | Hall | |
| 2010/0326740 A1 | 12/2010 | Hall et al. | |
| 2011/0020163 A1 | 1/2011 | Nilen | |
| 2011/0174549 A1 | 7/2011 | Dolan | |
| 2011/0226532 A1 | 9/2011 | Jonker et al. | |
| 2011/0283628 A1 | 11/2011 | Saridikmen et al. | |
| 2012/0012229 A1 * | 1/2012 | Kappel | A01G 23/067 144/235 |
| 2012/0037429 A1 | 2/2012 | Davies et al. | |
| 2012/0037430 A1 | 2/2012 | Smallman | |
| 2012/0040157 A1 | 2/2012 | Konyashin et al. | |
| 2012/0055717 A1 | 3/2012 | Liversage et al. | |
| 2012/0061149 A1 | 3/2012 | Liversage et al. | |
| 2012/0177453 A1 | 7/2012 | Konyashin et al. | |
| 2012/0247028 A1 | 10/2012 | Konyashin et al. | |
| 2012/0304547 A1 | 12/2012 | Anagnostaras | |
| 2013/0000993 A1 | 1/2013 | Shabalala et al. | |
| 2013/0213721 A1 | 8/2013 | Nilen et al. | |
| 2014/0110991 A1 | 4/2014 | Sollami | |
| 2014/0115974 A1 | 5/2014 | Konyashin et al. | |
| 2014/0165476 A1 | 6/2014 | Can et al. | |
| 2014/0198827 A1 | 7/2014 | Liversage | |
| 2014/0284115 A1 | 9/2014 | Can et al. | |
| 2014/0339879 A1 | 11/2014 | Burton et al. | |
| 2014/0339882 A1 | 11/2014 | Hall et al. | |
| 2014/0339883 A1 | 11/2014 | Burton et al. | |
| 2015/0016884 A1 | 1/2015 | Hall et al. | |
| 2015/0041225 A1 | 2/2015 | Jonker et al. | |
| 2016/0237631 A1 * | 8/2016 | Nishida | E01C 23/088 |
| 2019/0242076 A1 | 8/2019 | Latham | |
| 2019/0276993 A1 | 9/2019 | Sewell | |
| 2019/0360274 A1 | 11/2019 | Tian | |

FOREIGN PATENT DOCUMENTS

| | | |
|---|---|---|
| CN | 102296522 A | 12/2011 |
| DE | 202007016703 U1 | 2/2008 |
| JP | A1974023943 | 2/1974 |
| JP | 63141208 A | 6/1988 |
| JP | A1988141208 | 5/1990 |
| JP | H0839538 A | 2/1996 |
| JP | 11336018 | 12/1999 |
| JP | 2004263558 A | 9/2004 |
| JP | 2007284900 A | 11/2007 |
| JP | 2010248794 A | 11/2010 |
| JP | 2010248871 A | 11/2010 |
| JP | 2014515784 A | 7/2014 |
| TW | M255773 U | 1/2005 |
| TW | M515427 U | 1/2016 |
| WO | 2019104176 A1 | 5/2019 |

OTHER PUBLICATIONS

First Office Action issued by the Chinese National Intellectual Property Administration for People's Republic of China Patent Application No. 2018800867376 dated Aug. 4, 2021, 15 pages.

(56) References Cited

OTHER PUBLICATIONS

International Preliminary Report on Patentability from The International Bureau of WIPO dated Jun. 2, 2020 for corresponding International Application No. PCT/US2018/062259.
International Search Report from the ISA/US mailing date Feb. 14, 2019 for corresponding International Application No. PCT/US18/62259.
Search Report issued by the Chinese National Intellectual Property Administration for People's Republic of China Patent Application No. 2018800867376 performed Jul. 29, 2021, 3 pages.
Written Opinion of the International Searching Authority mailing date Feb. 14, 2019 for corresponding International Application No. PCT/US18/62259.
Office Action for Japanese Patent Application No. 2020-546292 dated Aug. 30, 2022, and English translation.
Office Action dated Apr. 4, 2023 pertaining to Japanese Patent Application No. 2020-546292.
Supplementary European Search Report dated Dec. 8, 2023 pertaining to EP 21744777.
European Search Report dated Nov. 8, 2023 pertaining to EP 23178994.

\* cited by examiner

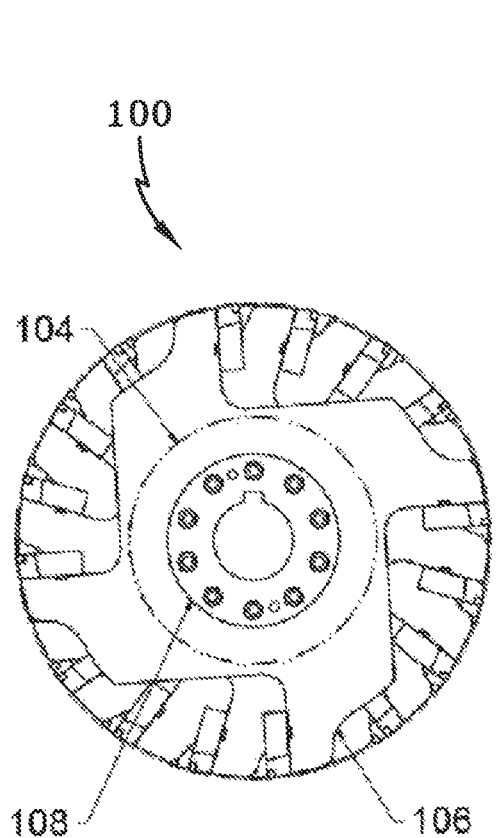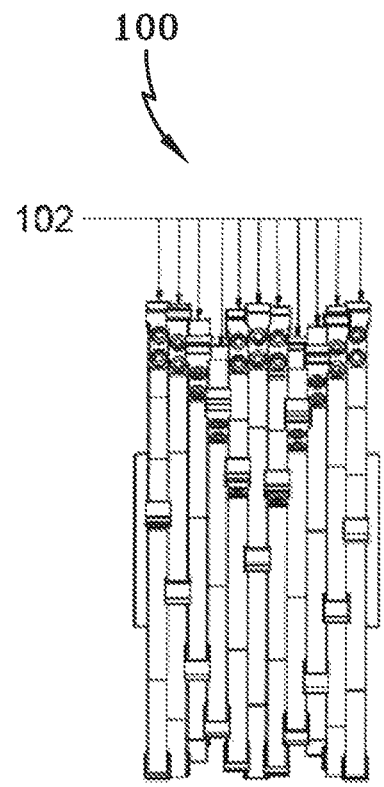
FIG.1A  FIG.1B
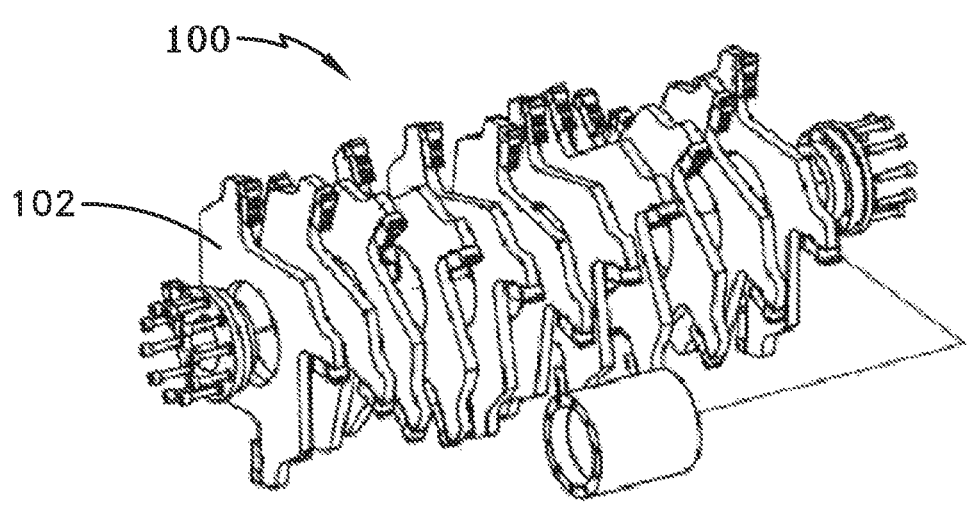
FIG.1C

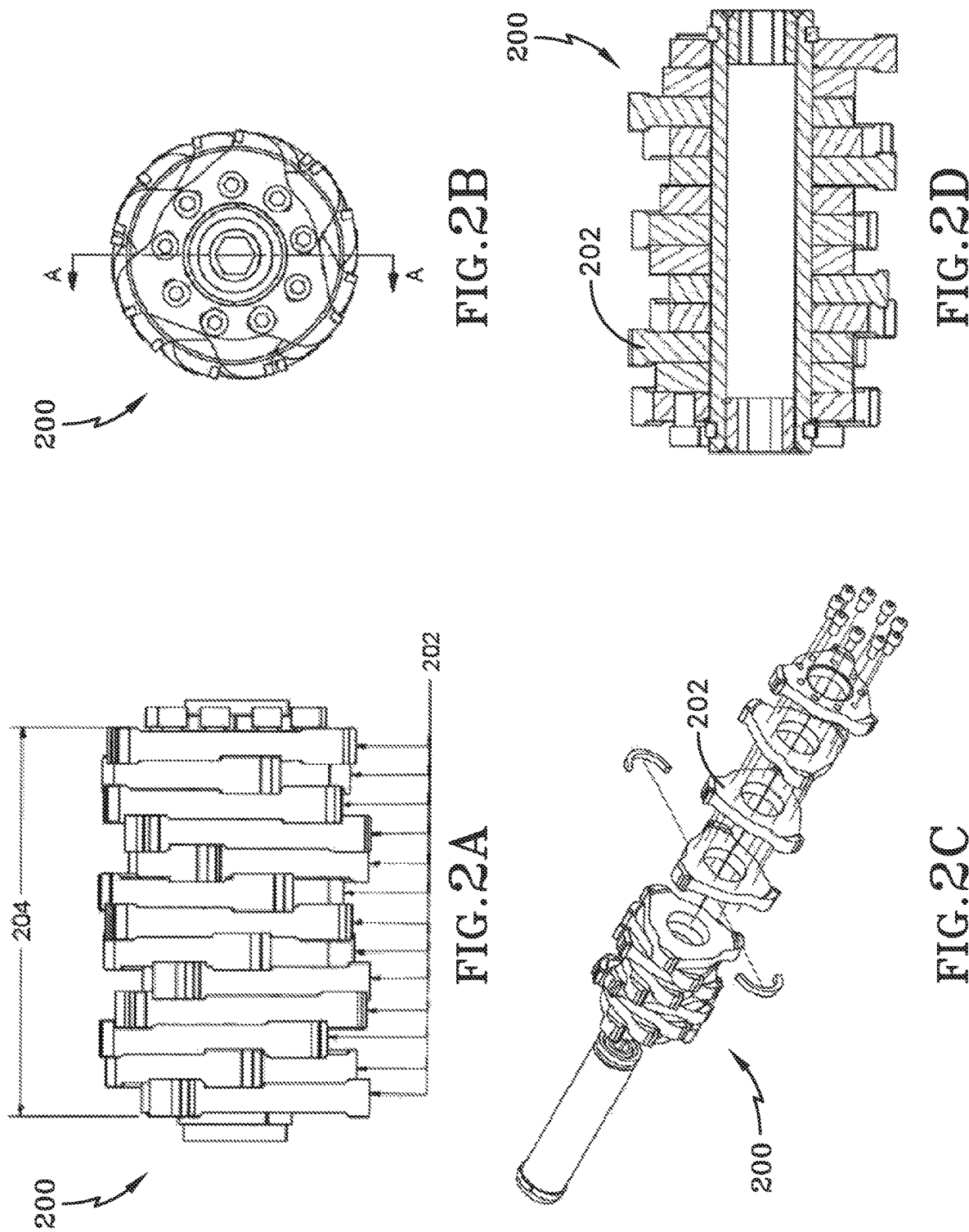

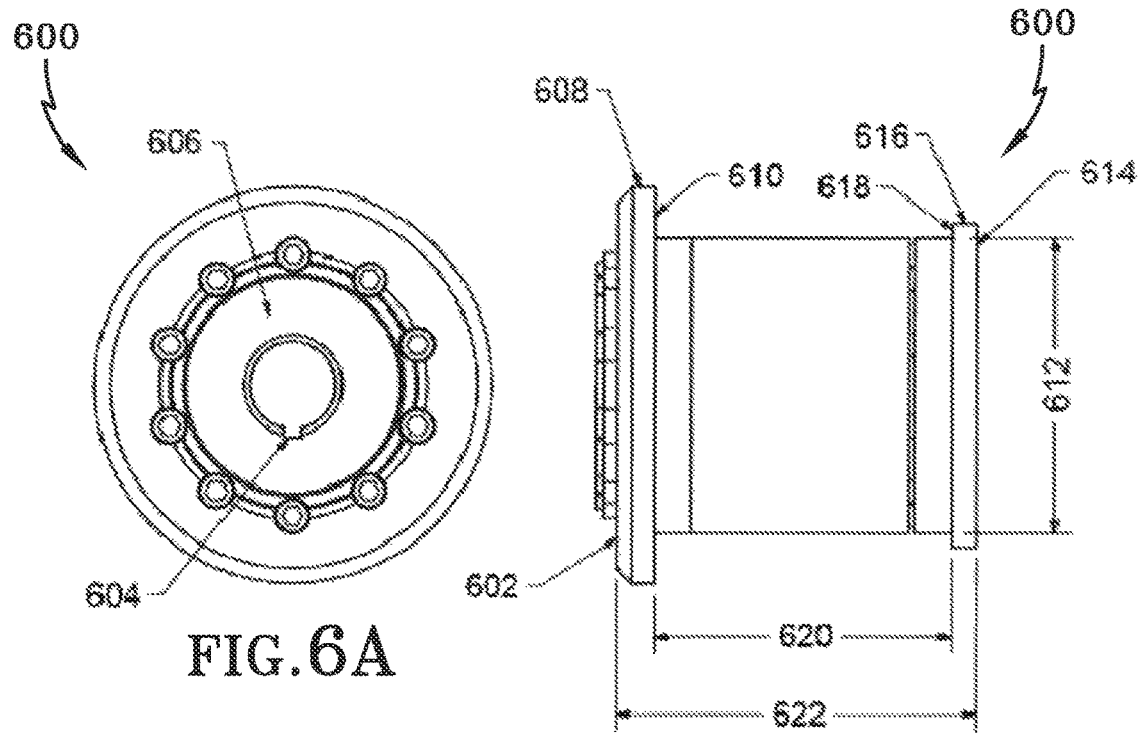
FIG.6A
FIG.6B
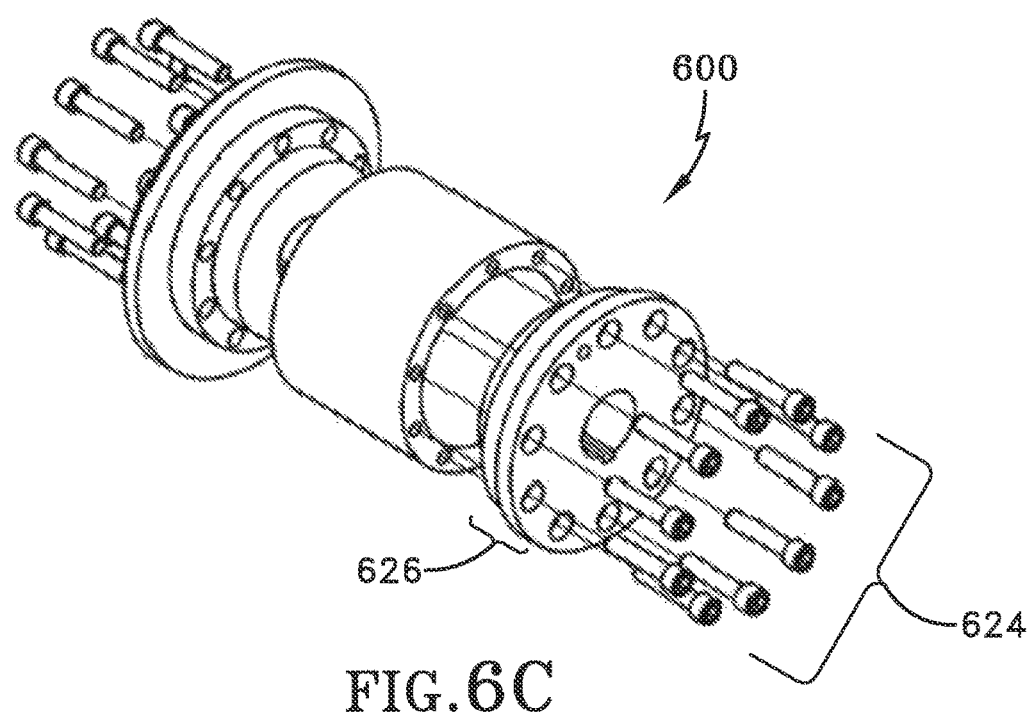
FIG.6C

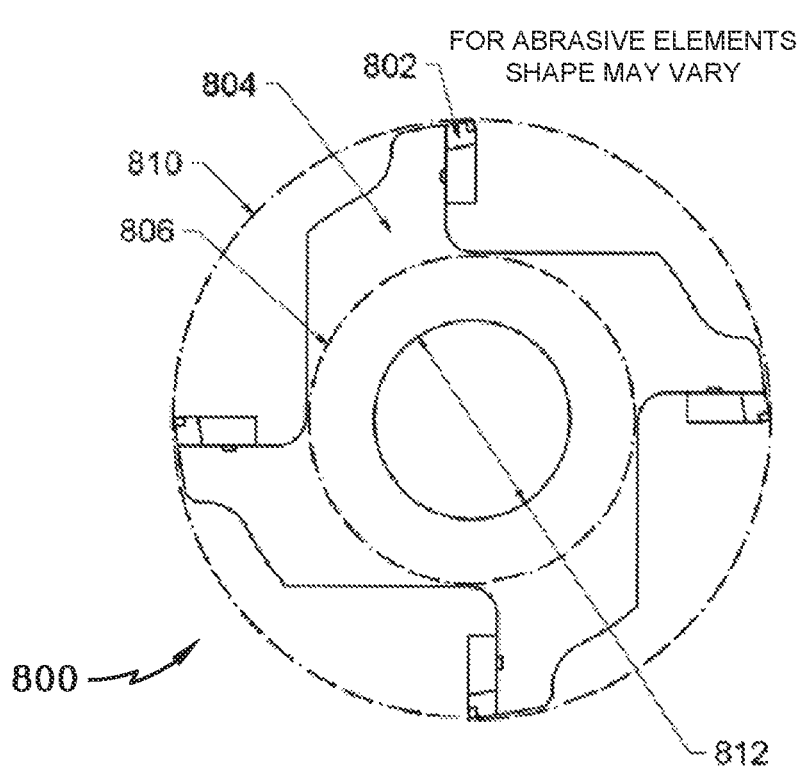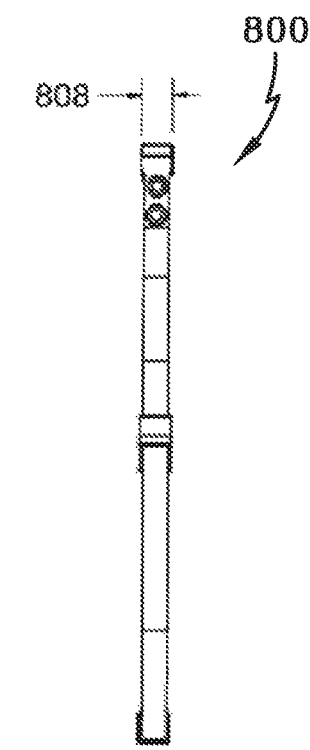
FIG.8A  FIG.8B
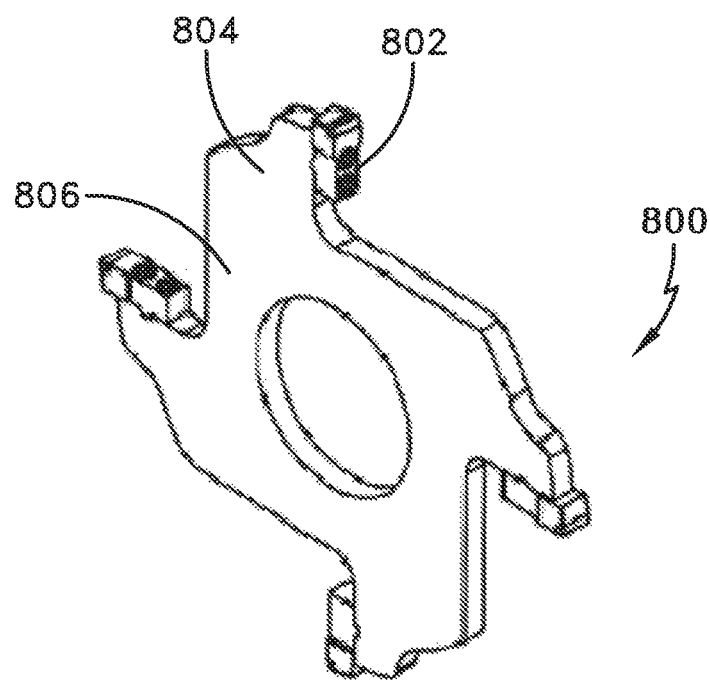
FIG.8C

FOR ABRASIVE ELEMENTS
SHAPE MAY VARY

FOR ABRASIVE ELEMENTS SHAPE MAY VARY

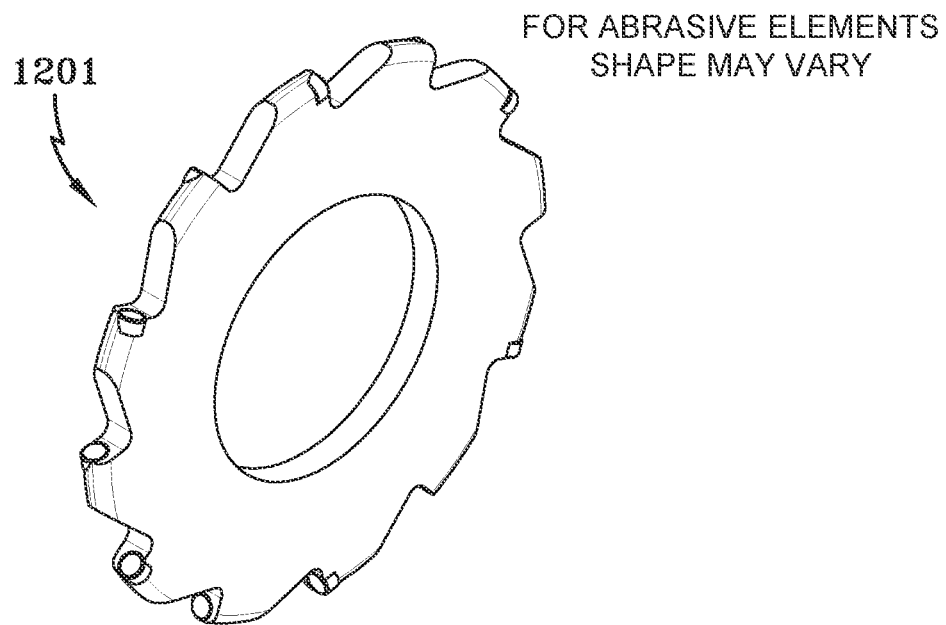
FOR ABRASIVE ELEMENTS SHAPE MAY VARY
FIG.12E1
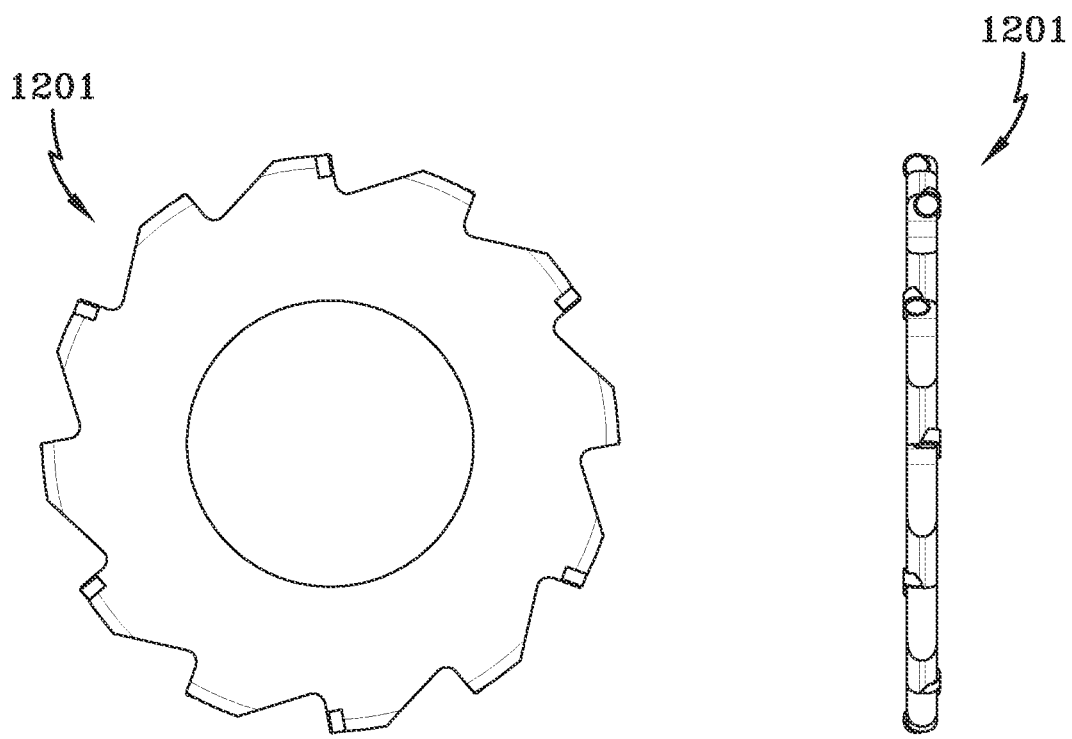
FIG.12D1  FIG.12C1

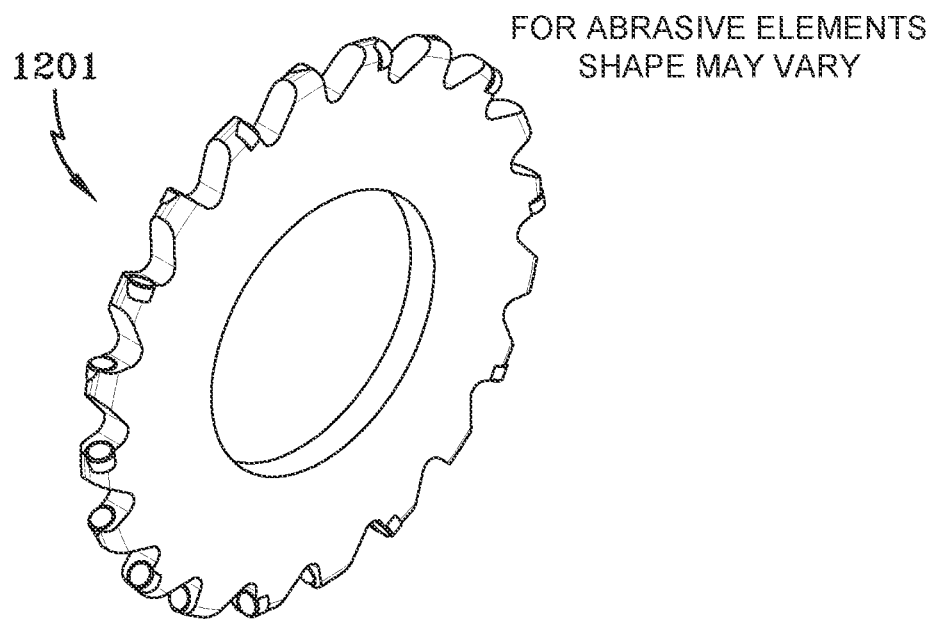
FOR ABRASIVE ELEMENTS
SHAPE MAY VARY
FIG. 12E2
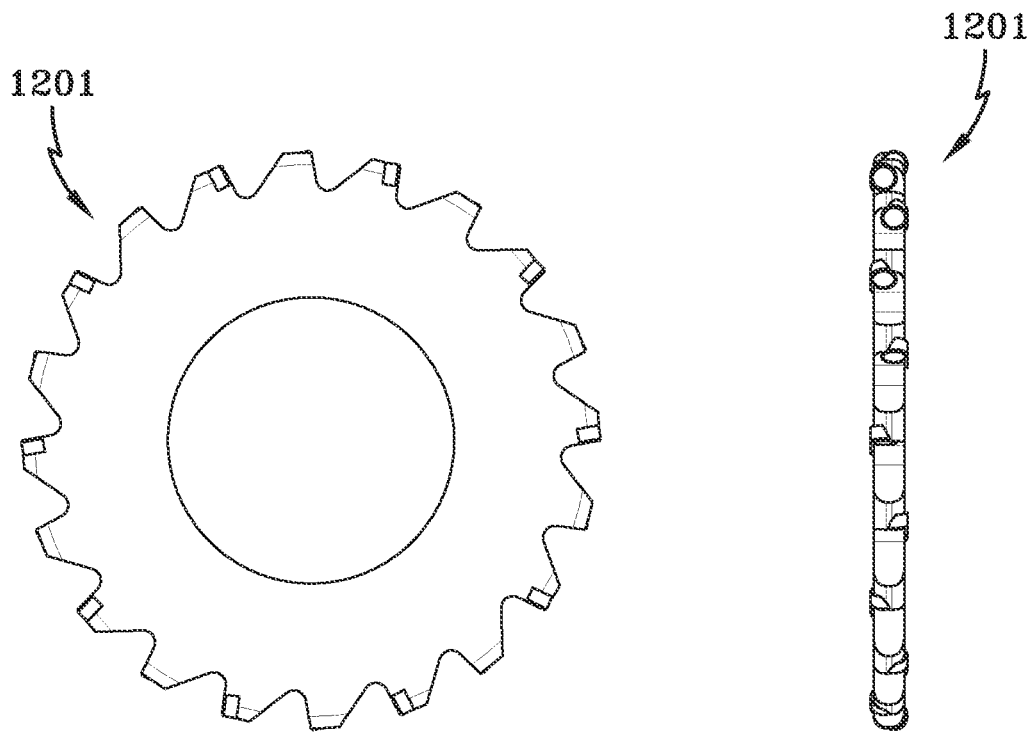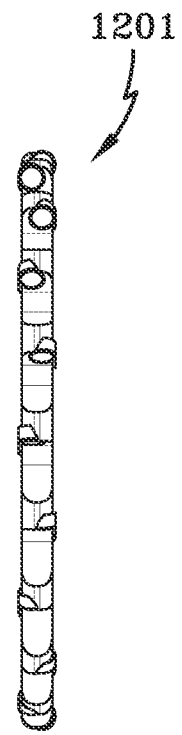
FIG. 12D2    FIG. 12C2

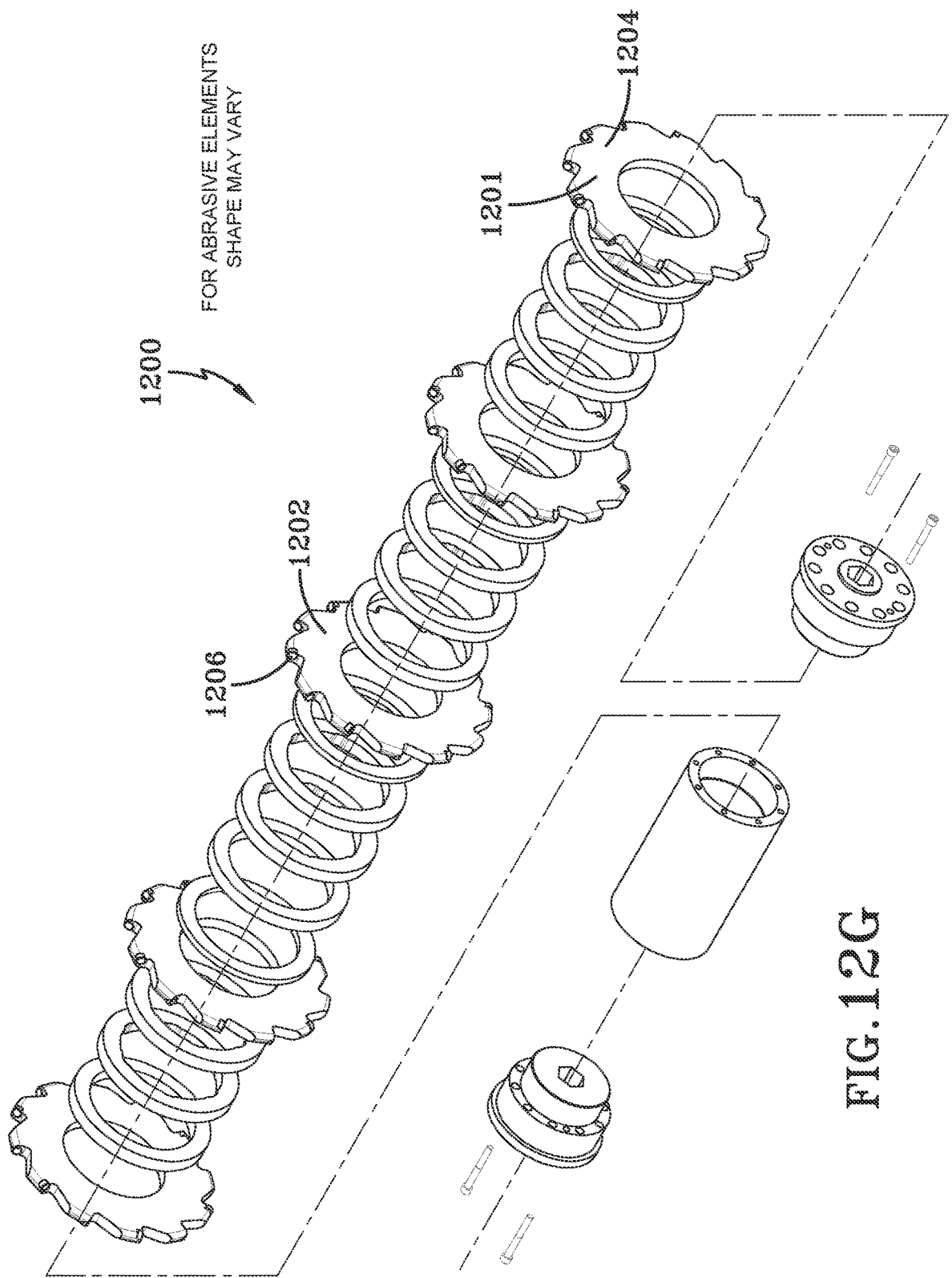

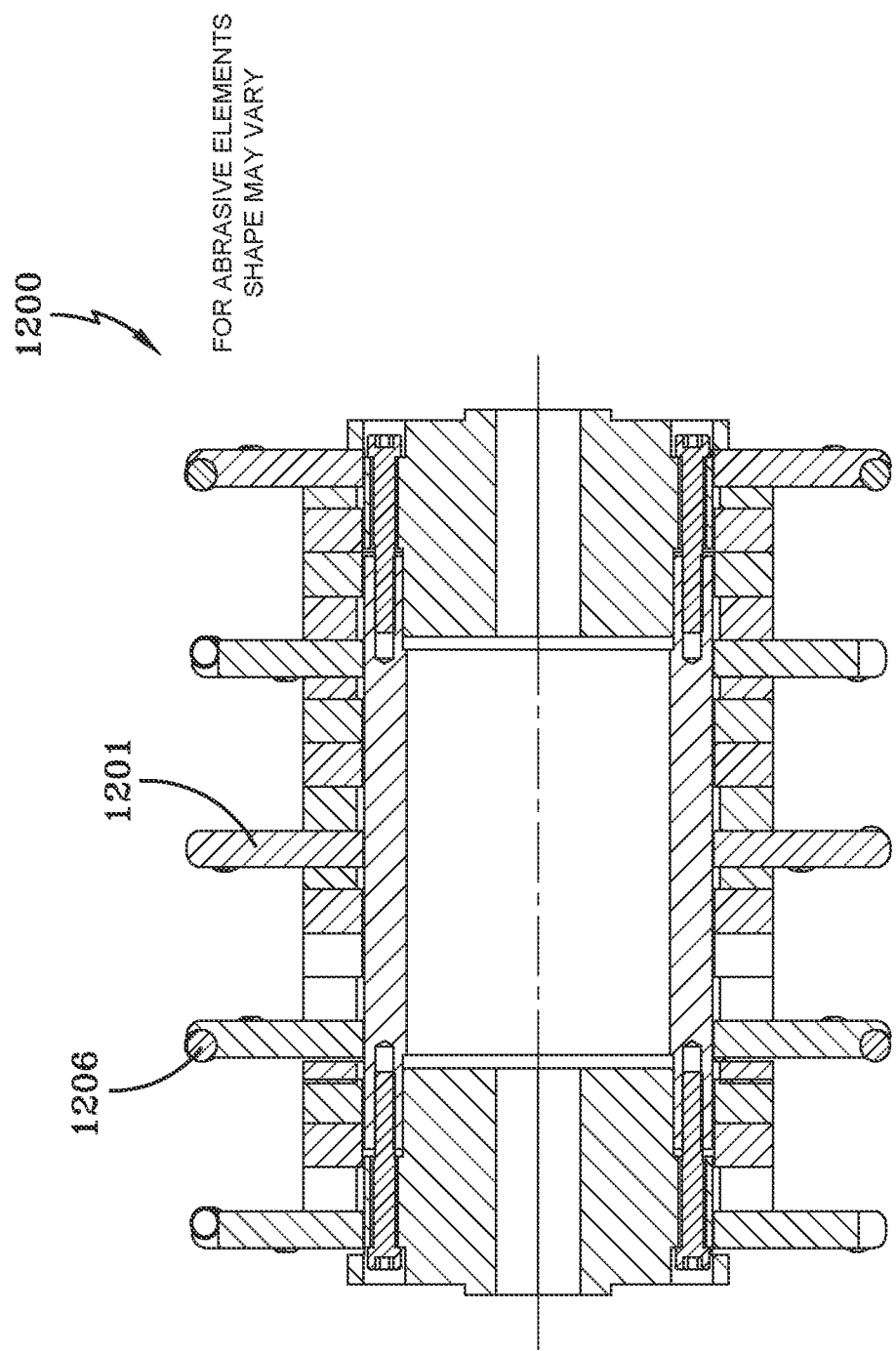

FOR ABRASIVE ELEMENTS SHAPE MAY VARY

FOR ABRASIVE ELEMENTS
SHAPE MAY VARY

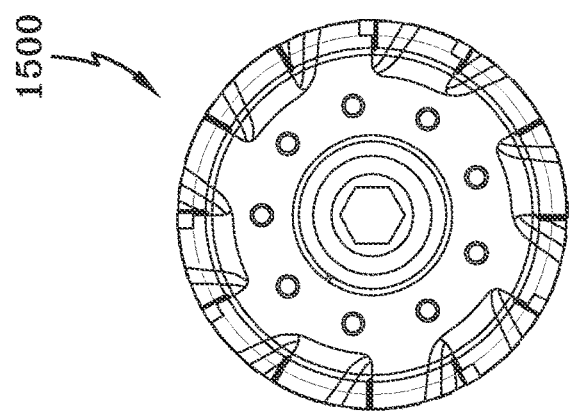
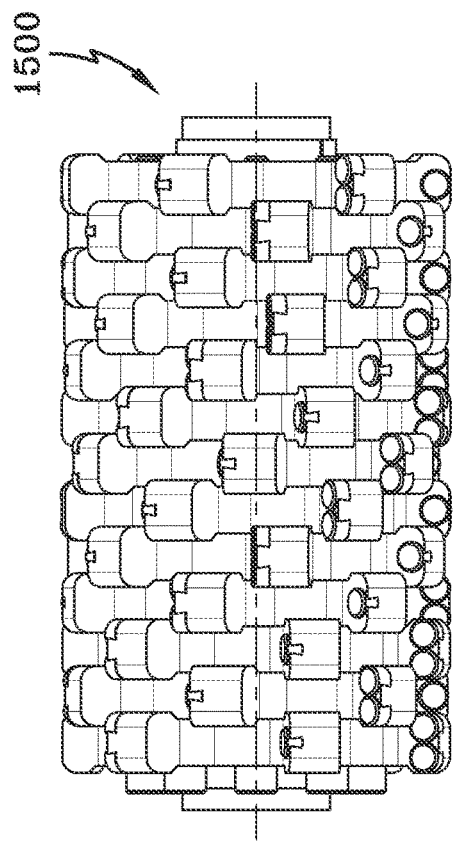
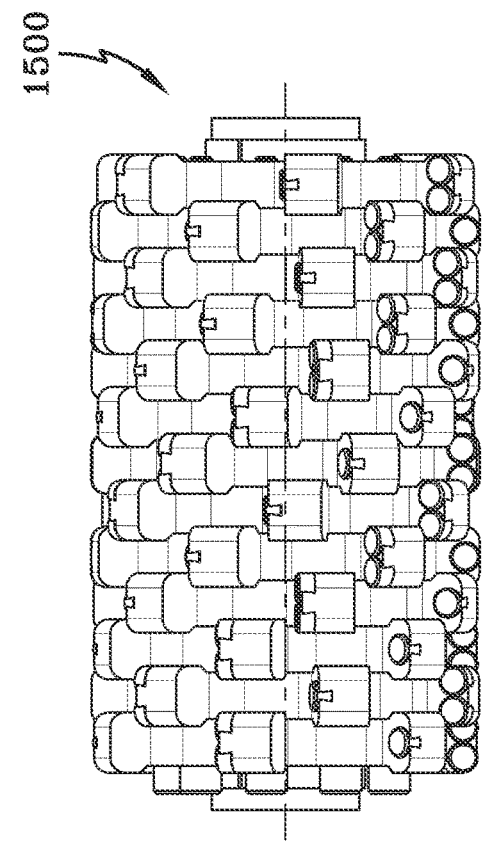
FOR ABRASIVE ELEMENTS SHAPE MAY VARY
FIG. 15B
FIG. 15C
FIG. 15D

FOR ABRASIVE ELEMENTS SHAPE MAY VARY

FOR ABRASIVE ELEMENTS SHAPE MAY VARY

FOR ABRASIVE ELEMENTS
SHAPE MAY VARY

MATERIAL REMOVAL MANUFACTURE, ASSEMBLY, AND METHOD OF ASSEMBLY

CROSS-REFERENCE TO RELATED APPLICATION

This application claims priority to and/or the benefit of U.S. patent application Ser. No. 16/198,359, filed Nov. 21, 2018 (issued Mar. 8, 2022 as U.S. Pat. No. 11,268,249), of which this application is a continuation. U.S. patent application Ser. No. 16/198,359, filed Nov. 21, 2018, claims the benefit of U.S. Provisional Application Nos. 62/590,727 filed on Nov. 27, 2017 and 62/590,724 filed on Nov. 27, 2017. The entireties of the abovementioned applications are incorporated herein by reference.

BACKGROUND OF THE INVENTION

Field of the Invention

The disclosed innovation relates to systems, manufactures and methods of fabricating systems for material removal purposes. More particularly, the innovation relates to a product that removes material, such as, for example removing concrete or asphalt from, a street in relation to removal and/or replacement of street pavement markers, or for another example, removing resins or other material from an industrial floor, or any other type of flooring/flooring material, as well as installation and/or removal of traffic markings, lines, and signals along with installation of inlay pavement markings. The innovation also relates to a system and method of assembling grinding and/or cutting blade elements, or blade elements and spacers, to fabricate a configuration that eliminates a need for a large milling drum. The method allows the configuration to be adjusted easily in field situations to most any material removal width of the pre-existing system by exchanging, adding or subtracting cutter plate elements and/or spacers.

Description of the Prior Art

In prior art material removal systems involving material removal, such as for example, grinding and/or cutting, the systems were typically made to a certain width in a manner comprising a single large milling drum. Milling drums of this nature are exposed to dirt, debris and other factors that result in damage. As is known in the art, various configurations of bits, chucks, picks, and the like may be attached to the single large milling drum in a variety of ways, either directly or with an intermediary, such as a holder, with the holder typically welded to the single large milling drum. Grinding and/or cutting heads may be used to grind or groove surfaces, such as concrete and asphalt surfaces, and are typically made to a certain width, such as 5-7" or 8". As may be appreciated, such milling drums are often specialized for a particular task. The single dedicated milling drum style prevalent in the art has drawbacks including often being too heavy for a single worker to handle during repair and/or maintenance. These and other disadvantages of the present art may be addressed by the disclosed innovation.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in aspects thereof, comprises systems, methods and articles that may include a milling-drumless system for material removal. The system may comprise a mandrel that engages a rotary drive. The mandrel may be a multi-piece construction and have a first piece that provides an inner shoulder and an inner cylindrical surface. The system may also have a labyrinth ring that engages the mandrel and provides an attachment point to a larger device; and at least one of a plurality of blade elements and a plurality of blade elements and spacers. It is to be appreciated that the plurality is highly customizable and that a predetermined customization is thus easily configured, either in a manufacturing environment or in a field situation.

Each of the plurality of blade elements and spacers may have an inner diameter such that fits a corresponding mandrel cylindrical surface, and each of the plurality of blade elements may have a core portion and a plurality of shoulder portions, wherein the core portion provides a lateral contact surface and the plurality of shoulder portions that provide an attachment area for an abrasive element, with the abrasive element attached such that the rotary motion of the rotary drive moves the abrasive portion and provides a working zone that removes material in which the zone is placed.

The disclosed innovation in certain embodiments may have a mandrel that has an end piece that provides a second interior shoulder and that, upon the mandrel pieces being attached, the at least one of a plurality of blade elements and a plurality of blade elements and spacers placed on the mandrel cylindrical surface are held in place with a transverse force parallel to the axis of the cylindrical surface portion of the mandrel.

Benefits beyond a more robust end product may also include reduced inventory, reduced carrying costs, and lower maintenance costs (in terms of either or both time and material).

To accomplish the foregoing and related ends, certain illustrative aspects of the innovation are described herein in connection with the following description and the annexed drawings. These aspects are indicative, however, of but a few of the various ways in which the principles of the innovation can be employed, and the subject innovation is intended to include all such aspects and their equivalents. Other advantages and novel features of the innovation will become apparent to those skilled in the art from the following detailed description of the innovation when considered in conjunction with the drawings, and it is intended that the innovation be constructed as including all such modifications and alterations insofar as they come within the scope of the appended claims or the equivalents thereof.

BRIEF DESCRIPTION OF THE DRAWINGS

The innovation may take physical form in certain parts and arrangement of parts, various embodiments of which will be described in detail and illustrated in the accompanying drawings:

FIGS. 1A-1C present, respectively, side, front, and isometric views of a head assembly of a system according to aspects of the innovation.

FIGS. 2A-2D present, respectively, front, side, isometric, and cutaway views of a head assembly of a system according to aspects of the innovation.

FIGS. 6A-6C present, respectively, side, front, and isometric views of a manufacture according to aspects of the innovation.

FIGS. 8A-8C present, respectively, side, front, and isometric views of a manufacture according to aspects of the innovation.

FIGS. 10A-10D present, respectively, side, isometric, top, and end views of a "double" abrasive element 1000A according to aspects of the innovation, while

FIGS. 12A-H present various view of an additional embodiment of an assembly according to the present innovation.

FIGS. 15A-15G present various views of yet another additional embodiment of an assembly according to the present innovation.

DETAILED DESCRIPTION OF THE PREFERRED EMBODIMENTS

Figure 3B:
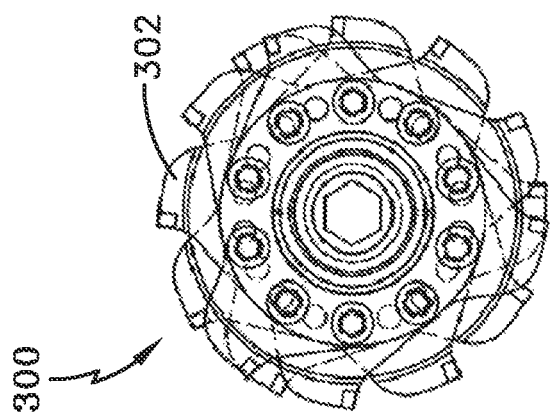
FIGS. 3A and 3B present, respectively, front and side views of a head assembly of a system according to aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices may be shown in block diagram form in order to facilitate describing the innovation.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

The figures show various views for various embodiments of systems of completed head assemblies, along with component parts. Some of these head assemblies feature various embodiments of material removal (such as grinding or cutting) portions of blade elements while other assemblies feature various embodiments of blade elements in combination with (or without) spacer elements.

It is to be appreciated that the innovation provides for far greater flexibility than the current state of the art. The innovation provides for the ability to have different systems of interchangeable and flexibly configurable head assemblies, as presented herein in example embodiments, as well as other systems that a person of ordinary skill in the art, upon reading and appreciating the disclosed innovation, may configure and assemble.

For embodiments as shown in the various figures, a head assembly may be comprised of a predetermined combination of blade and spacer elements. For each of the predetermined configurations, the selection of blade elements and spacer elements may be referred to in their entirety as a blade head assembly, and may comprise at least one blade element, or alternatively at least two blade elements and at least one spacer element, or alternatively a predetermined combination of a plurality of blade elements and spacer elements thereof. Blade head assemblies may be configured by stacking blades, or alternatively blades and spacers, to include a predetermined number of blades, anywhere between a single blade upwards to as many blades as may fit a given tool width, and/or for a particular intended application of use. The number of blades so contained is not a limitation for the disclosed innovation. Individual blade element configurations will be discussed further in relation to FIGS. 7A-7C and FIGS. 8A-8C. It is to be appreciated that "head assemblies," "blade head assemblies," and "systems" may be used interchangeably, also terms such as "cutter plate" and "blade elements" may be used interchangeably, and the meaning shall be clear from the context of use.

Turning now to FIG. 1A, pictured is an example embodiment that features replaceably mounted blade elements and a system with a blade assembly without spacers. This embodiment provides for a material removal zone of an entire predetermined width, analogous to an action by the different conventional milling drum with material removal elements configured for material removal across the width of the milling drum but without the drawbacks of such a milling drum.

An assembly 100 may contain a mandrel assembly, for example mandrel assembly 500 of FIG. 5, that will be discussed in further detail below in relation to FIG. 5. An example method of fabricating assembly 100 will be discussed in further detail below in relation to FIG. 10. Assembly 100 may contain blade elements 102 of a predetermined quantity stacked in lateral contact of a blade body zone to blade body zone (also discussed as a core zone) such that a perimeter of contact creates a Zone 1 104. Blade elements 102 are stacked coaxially, and each set of stacked blade elements 102 form a blade body or core zone. Details of blade elements will be discussed later in relation to FIGS. 7-8. FIGS. 1A-1C show a portion of Zone 1 104 indicating a part of an array of blade elements 102 stacked coaxially that creates body to body contact. Each blade element 102 has a plurality of peripherally extending shoulders 106. Shoulders 106 of adjacent blades 102 may be offset from each other when coaxially stacked. A smaller diameter Zone 2 108 is provided within Zone 1 104. As explained below, the diameter of an end piece of a mandrel creates a transverse locking pressure on the blade head assembly 100 through Zone 2 108 that is parallel to the axis of the cylindrical portion of the mandrel. In a blade head assembly, such as assembly 100, the continuous surface created by outer surface of the blade element (and in embodiments featuring spacers, of the adjacent blade element(s) and spacer(s)) across the width of the blade head assembly provides an effective barrier to dirt and debris from reaching the interior of the blade head assembly, including at least the mandrel, the keyway and drive shaft. Holes or slots in individual blade elements (not shown), which are contemplated in some embodiments to lighten the weight of blade elements, that are within Zone 1 104 do not present a trap for dirt, debris or other damaging items.

Turning to FIGS. 2A-2D, another example embodiment of a blade head assembly 200 is presented. Similar to blade head assembly 100, blade assembly 200 is configured with blade elements 202 such that material removal capability is provided along the width of the assembly 204. Blade assembly 200 contains a mandrel assembly that will be discussed in further detail below in relation to FIG. 5. An example method of fabricating assembly 200 will be discussed in further detail below in relation to FIG. 10. Assembly 200 may also be distinguished from example assembly 100 in blade configuration, which will be discussed in greater detail below in relation to FIGS. 7 and 8.

Figure 3A:
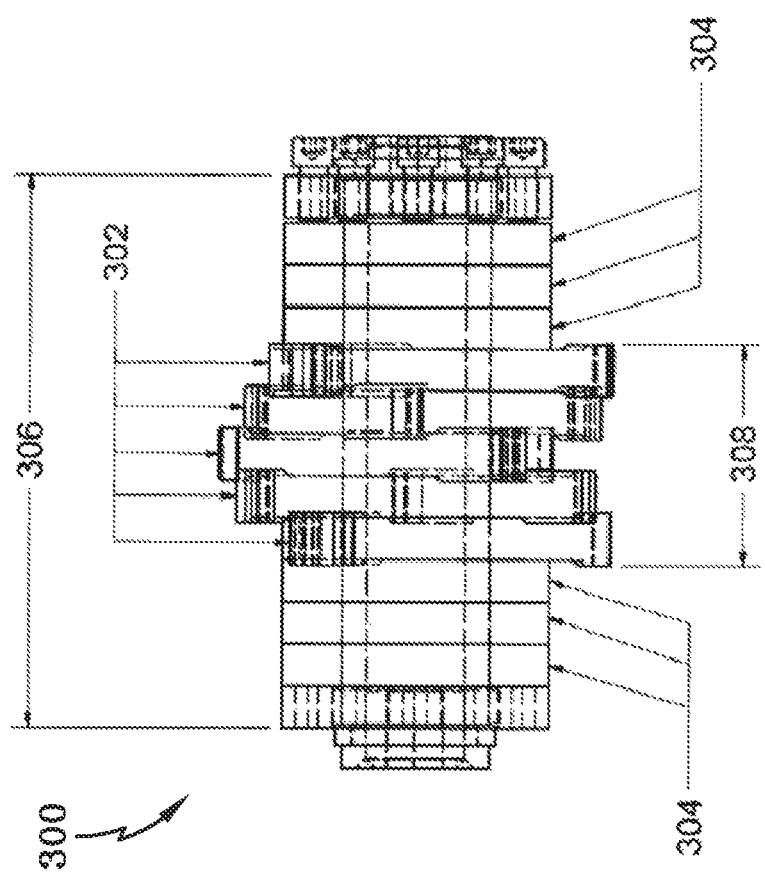

Turning now to FIGS. 3A and 3B, another example embodiment of a blade head assembly 300 is presented. Distinguishing from blade head assemblies 100 and 200, blade assembly 300 is configured with blade elements 302 and spacer elements 304 such that material removal capability is not necessarily provided along the entire width of the assembly 306. It should be understood that in certain embodiments and applications of material removal, it may be desired to remove subsets of material within the working zone of the material removal system. For example, a material removal application may aim to remove road lane markings while not removing any material from either side (or between) such road lane markings. In this example assembly, blade elements and spacers are configured such that a material removal width 308 may be created by providing blade elements 302 that contribute to a desired material removal working zone interspersed with corresponding adjacent spacers that may provide a zone within the system span that will not remove material. The non-material removal zones may be according to a predetermined configuration and may be configured to suit various road conditions, such as, for example, removing only a single width of a road lane marking while not removing any road material covered by the assembly width. In the present example of FIGS. 3A and 3B, material removal width 308 is located centrally in the blade assembly width, but it is to be appreciated that various, and even multiple, locations of material removal capability (as shown in FIG. 4B) are provided with the disclosed innovation. Blade assembly 300 contains a mandrel assembly that will be discussed in further detail below in relation to FIG. 5. An example method of fabricating assembly 300 will be discussed in further detail below in relation to FIG. 10. Assembly 300 may also be distinguished from example assembly 100 (and may be similar to example assembly 200) in blade configuration, which will be discussed in greater detail below in relation to FIGS. 7 and 8.

Figure 4A:
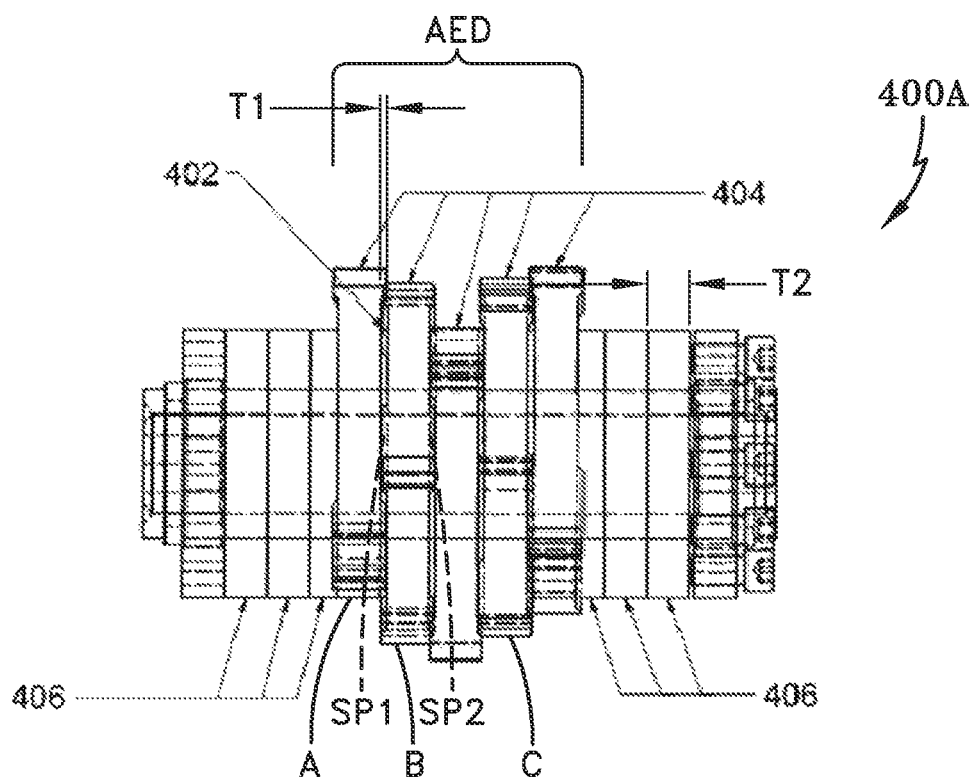
FIGS. 4A and 4B present, respectively, front views of a head assembly of a system according to two aspects of the innovation.
Figure 4B:
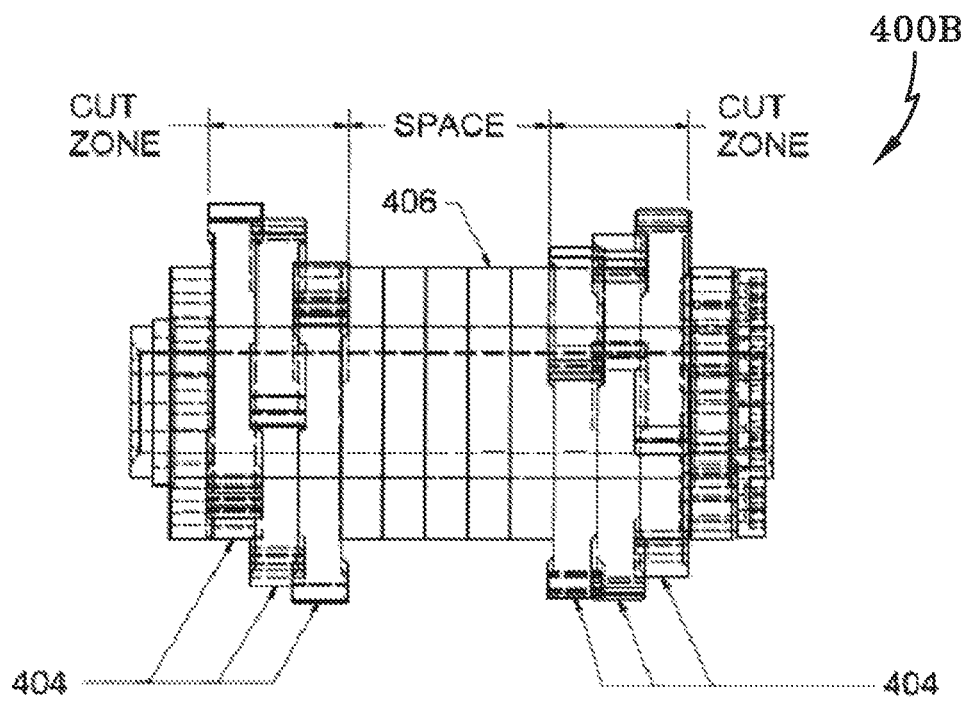

Turning now to FIGS. 4A and 4B, additional example embodiments of blade head assemblies with spacers are provided. In example blade assembly 400A, a transverse section view shows a configuration with multiple sized spacers 402. Spacers 402, which may be at least one spacer, of a predetermined thickness T1, internal to blade elements 404 may be used such that the placement and spacing of blade element 404 cutting edge is precisely controlled. Such spacers may provide a number of purposes. It should be understood and appreciated that the particular thickness(es) of both spacers and blade elements may be any such thickness conventional in the art, such as for example in the range of 0.05 inches-2 inches, or more particularly in the range of 0.087 inches to 2.0 inches, and may advantageously have a thickness corresponding to the thickness of an adjacent blade element(s). As previously indicated, such spacers may provide for altering the configuration of material removal zones within the width of the overall system. A further utility may be to provide different degrees of overlap of the material removal sections of adjacent cutter plate elements. Other embodiments of spacers 406, which may be at least one spacer, of thickness T2 may be used on the either edge of the blade assembly 400A to provide for the complete width of the system. It should be understood and appreciated that the particular thickness(es) of both spacers and blade elements may be any such thickness conventional in the art, for example in the range of 0.05 inches-2 inches, or more particularly in the range of 0.087 inches to 2.0 inches, and may advantageously have a thickness corresponding to the thickness of an adjacent blade element(s). For example, it may be advantageous to have a larger width spacer such that fewer elements make up the system assembly. It is to be appreciated that in some embodiments, the arrangement may provide a full width of material removal capability along the axis of the system assembly, while in other embodiments, less than a full width (or multiple widths) may be configured as may be desired. Example blade assembly 400B illustrates an example with using spacers 406 with a given desired thickness that is a similar or identical thickness to the thickness of the adjacent set of corresponding blade element (s) 404. Example blade assembly 400B illustrates an example of a configuration such that multiple material removal zones are achieved. Blade assemblies 400A and 400B each contain a mandrel that will be discussed in further detail below in relation to FIG. 5. An example method of fabricating assemblies 400A and 400B will be discussed in further detail below in relation to FIG. 10. Assembly 400A and 400B, as shown, may also be distinguished from example assembly 100 (and may be similar to example assembly 200) in blade configuration. It is to be appreciated that blade assemblies in other embodiments than those shown may advantageously be configured with multiple blade configurations, which will be discussed in greater detail in relation to FIGS. 7 and 8.

In some embodiments of an assembly of multiple blades in accordance with the present innovation, it may be desired or advantageous to have a predetermined segment-spacing between adjacent grinding and/or cutting portions, as may be measured along an axis of the assembly central head axis as determined by the axis of the cylindrical portion of the mandrel. Segment-spacing may be achieved with the use of at least one spacer. In embodiments as discussed herein, spacers of at least one spacer may be substantially circular in configuration (i.e., in circumference) and may have a predetermined outer diameter, and a predetermined thickness. Outer diameters may advantageously range, for example, from seven inches to 30 inches. Nevertheless, it should be appreciated that any outer diameters conventional in the art may be employed within the scope of the present innovation. It is to be appreciated that spacers of various thickness(es) may be desired as portrayed in FIGS. 4A and 4B. It should be understood and appreciated that spacers and blades of any desired thickness as conventional in the art may be employed in accordance with the present innovation, as well as that the outer diameter of spacer(s) may advantageously correspond to that of corresponding adjacent blade elements. In several embodiments, a blade head assembly may include a first spacer SP1 that is positioned between successive blade elements A and B and a second spacer SP2 that is positioned between different successive blade elements B and C. By including spacers SP1 and SP2, adjacent grinding segments can be spaced from one another wherein there is no diamond-to-diamond contact between the segments. Instead, there is metal-to-metal contact between blade core portions and spacers. It is to be appreciated that the assembly of blades may occur with or without spacers in a staggered rotation mode wherein an abrasive element dimension (for example, a width AED) may be wider than the thickness of a cutter plate to which the abrasive element is attached, and the use of spacers may provide for respective abrasive elements on adjacent cutter plates to avoid interfering one with another. Further, most any desired spacing may be created for various desired material removal applications, for example, grooving concrete, by configuring multiple plates and/or spacers as may be desired.

As will be discussed later in relation to FIG. 10, in some embodiments, assembly of a head assembly, a spacer may be manually positioned between each blade core to produce the desired spacing between the cutting segments. In other embodiments, no spacers between blade cores may be desired to achieve a solid width of a predetermined material removal zone.

Figure 5A:
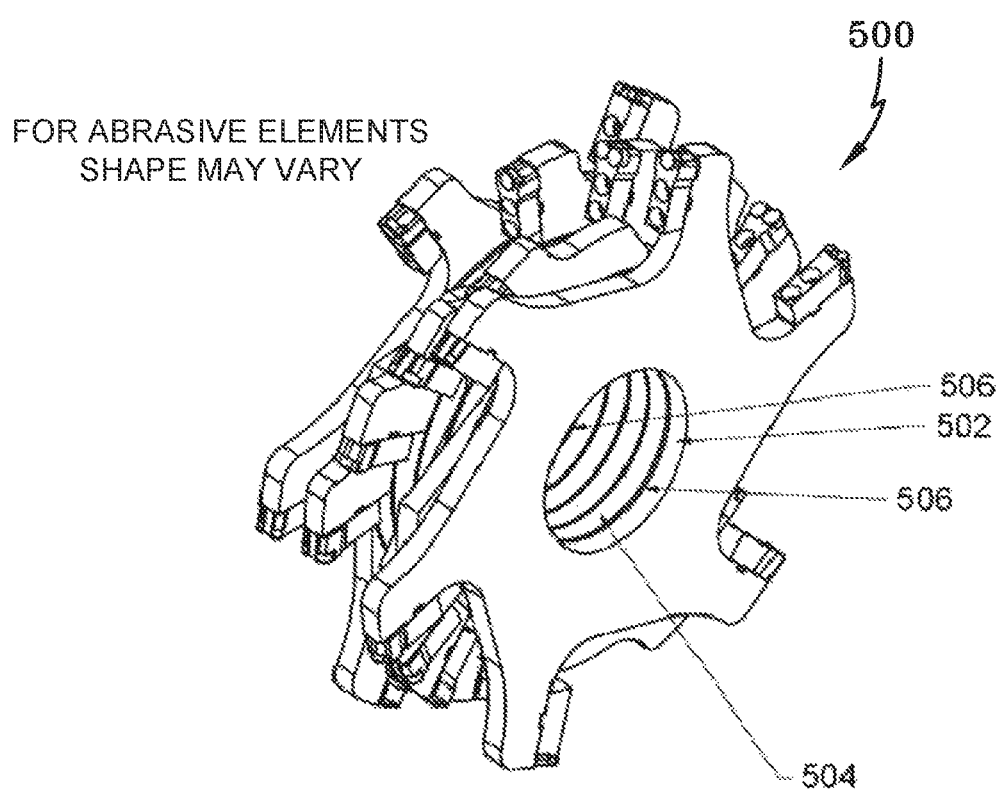
FIGS. 5A and 5B present, respectively, isometric, and partial front views of a head assembly of a system according to aspects of the innovation.
Figure 5B:
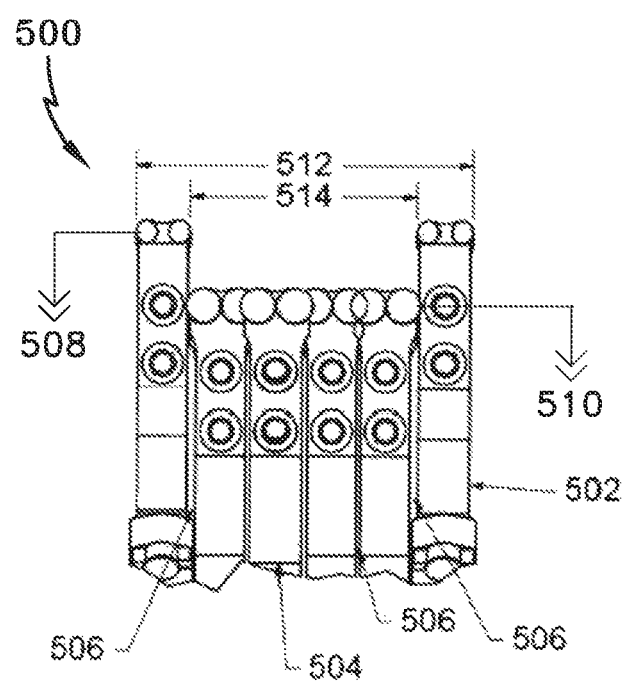
Figure 17:
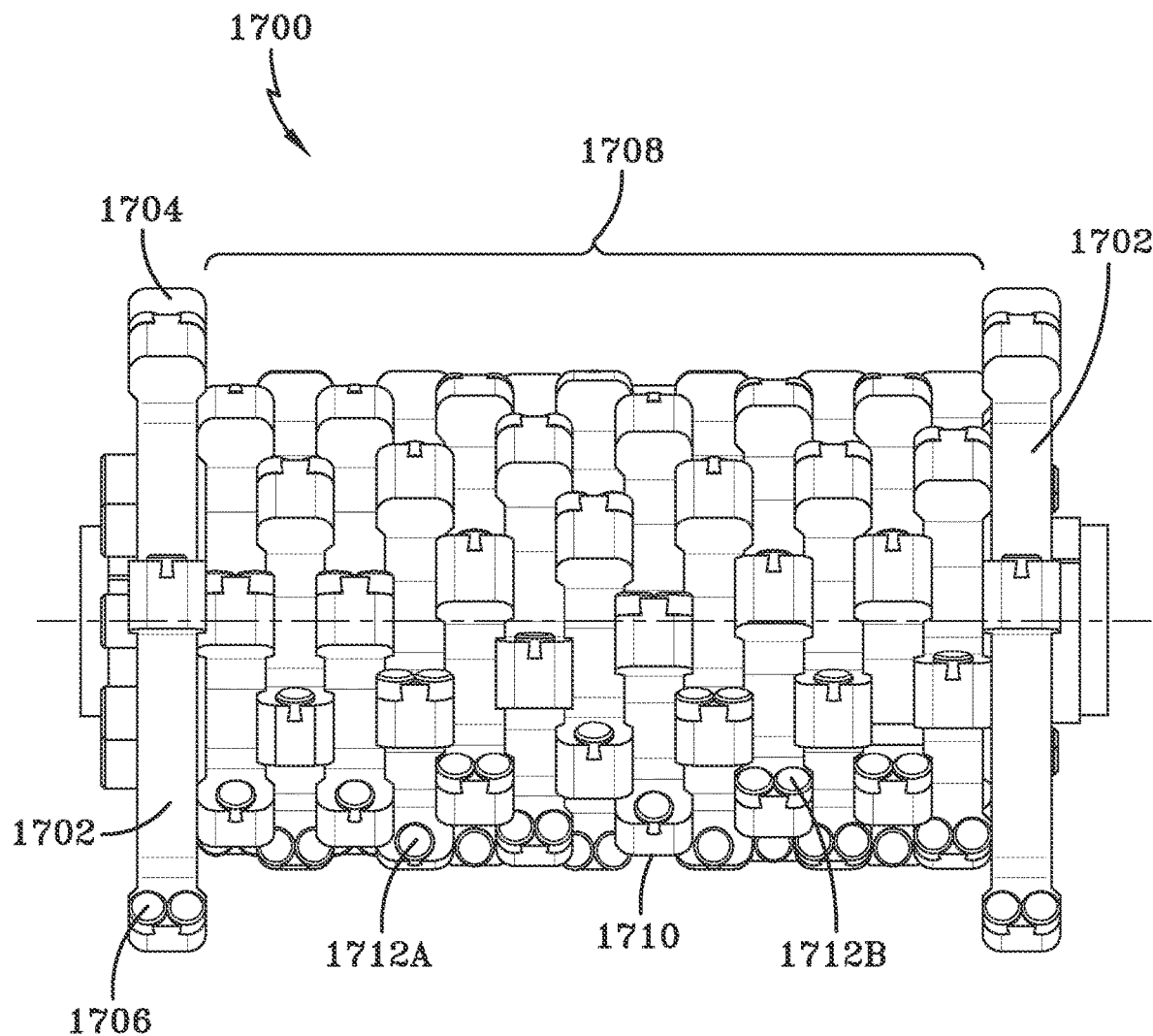
FIG. 17 presents a side view of yet another embodiment of an assembly according to the present innovation.

Turning now to FIG. 5, another example embodiment of a blade head assembly 500 is presented. Distinguishing from prior example blade head assemblies 100, 200, 300 and 400, blade head assembly 500 is configured with blade elements 502, 504 and spacer elements 506 such that in addition to material removal capability not being provided along the entire width of the assembly 500, there is more than one radial distance from the system centerline that provides a material removal zone. With a configuration of different blade elements having abrasive elements at different preselected radial distances, a plurality of different material removal zones can be affected. Blade elements 502 may have abrasive elements at an effective radial distance 508. Blade elements 504 may have abrasive elements at an effective radial distance different from radial distance 508 by a predetermined amount 510. Thus, within a material removal zone 512, a second different depth of material removal zone 514 can be achieved. In certain embodiments and applications of material removal, it may be desired to remove multiple subsets of material within the width of the working zone of the material removal system and to do so at more than one level of material removal depth in the same pass. For example, a material removal application may aim to remove road material in preparation for installing lane reflectors. Lane reflectors, as are known in the art, may have one or more tongues and one or more flat regions that are to be embedded in a road, with the tongues and flats embedded at different depths in the road. It may be advantageous to be able to remove road material at more than one depth in controlled areas as well as not remove any material to either side of such lane reflectors. In this example assembly, blade elements and spacers are configured such that a plurality of first material removal width (as pictured, zone 512 less zone 514) may be created by providing blade elements that contribute to a material removal working zone at a first radial distance 508, with a plurality of second material removal width 514 created by providing blade elements that contribute to a second material removal working zone at a second radial distance (as pictured, 508 less 510). Embodiments as pictured may also be interspersed with a plurality of spacers (not shown therein) that may provide a zone within the system span that enable fine control of the dimensions of the several material removal zones, as well as zones that will not have material removed. The non-material removal zones may be according to a predetermined configuration and may be configured to suit various road conditions. Other embodiments (not shown) may provide for multiple material removal zones at multiple radial circumferences across the width of the working zone. As shown therein, each holder of each blade element may comprise two abrasive elements. However, it should be appreciated that each holder of each blade element could also comprise a single abrasive element or even an alternating configuration of abrasive elements around the outer periphery of the blade element (plate), such as two abrasive elements on a holder followed by a single abrasive element on a following subsequent holder of the same blade element (as discussed in greater detail below). In other words, as shown therein, the two outermost blade elements (plates), or a plurality outermost blade elements, on each opposing end of the assembly can advantageously cut/grind at a first depth, and where the innermost blade elements (plates) between the outermost plates cut/grind at a second depth such as for forming the bottom part of an "H" during the downward plunging motion of operation. In this instance, the first depth would be deeper than the second depth. In another instance, the first depth may be shallower than the second depth. As shown, the outermost blade elements 502 comprise two abrasive elements at 508, but may comprise a single abrasive element or more than two abrasive elements within the scope of the present innovation. As also shown, abrasive elements shown at 508 are circular in shape but can also be any other shape such as but not limited to truncated circular (discussed further below), rectangular, triangular, polygonal, hexagonal, and the like. With reference to FIG. 17, a representation of such an embodiment is shown at assembly 1700. Assembly 1700 is otherwise configured and constructed as discussed herein with respect to the other embodiments and with respect to the alignment of the plurality of blade elements (plates) relative to each other. As shown, assembly 1700 includes a pair of opposing end plates 1702 but may alternatively include a plurality of opposing sets of end plates (i.e., more than one on each side of assembly 1700). Each end plate 1702 comprises at least one holder 1704 for holding at least one abrasive element 1706. As depicted, at least one abrasive element 1706 is shown as a pair of abrasive elements on each holder of the opposing pair of end plates 1702. Opposing end plates 1702 have corresponding diameters that may be any such diameter desired for a particular application, such as for example between 18-20 inches in diameter. A plurality of secondary blade elements (plates) 1708 is provided between the opposing pair of end plates 1702. As shown, secondary blade elements 1708 comprise any such diameter desired for a particular application but which is a diameter smaller than that of opposing pair of end plates 1702, such as for example between 18-20 inches in diameter, or more particularly between 18-19 inches in diameter. Blade elements 1708 each comprise at least one holder 1710 for holding at least one abrasive element. As explained above, each blade element of blade elements 1708 comprises an alternating pattern around the outer periphery of the blade element of a single abrasive on a holder 1712a followed by two adjacent abrasive elements on the same holder 1712b. As shown therein, the two outermost blade elements (plates) 1702 on each opposing end of the assembly can advantageously cut/grind at a first desired depth and wherein the innermost blade elements (plates) 1708 between the outermost plates cut/grind at a second desired depth, such as for forming the bottom part of an "H" during the downward plunging motion of operation. In this instance, the first desired depth would be deeper than the second desired depth. A plurality of spacers in accordance with the present innovation may be provided between each blade of the plurality of blades 1708, as well as between the two outermost blade elements of plurality of blade elements 1708 and the adjacent corresponding outermost blade elements 1702 (spacers not specifically shown in FIG. 17). Spacers may advantageously have an identical diameter to that of the corresponding adjacent blade elements of plurality of blade elements 1708. Spacers may also have thicknesses in the range of 0.062-0.2 inches, including 0.062 inch, 0.095 inch, 0.120 inch, 0.087 inch, and 0.102 inch. As also shown, abrasive elements shown at 1706, 1712a, 1712b are circular in shape but can also be any other shape such as but not limited to truncated circular (discussed further below), rectangular, triangular, polygonal, hexagonal, and the like.

FIG. 6 presents side, front and isometric views of a mandrel assembly according to aspects of the innovation. In an example embodiment, mandrel assembly 600 may be comprised of a plurality of split pieces, Piece 602 may constitute a sleeve that mates with a variety of drive shafts, and a key way 604 that may facilitate the alignment of bolts that, upon assembly and tightening, provide a transverse pinching force to a plurality of blade elements or a plurality of blade elements and spacers of various embodiments of a blade head assembly, inwardly directed and parallel to the axis of a cylindrical portion of the mandrel. It is to be appreciated that road equipment to which the innovation may mate may have a variety of different, albeit standard, drive shaft sizes. A labyrinth ring 606 may assist in mating a mandrel assembly 600 to the variety of drive shafts (not shown), as may the keyway 604 as is known in the art. Likewise, mandrels in various sizes may be contemplated to be within the scope of the disclosed innovation. A plurality of bolts for example, or other attachment mechanisms (624 in FIG. 6C) may advantageously attach the mandrel split pieces through corresponding through-holes (626) of an adjacent split piece. A labyrinth ring (not shown therein) may similarly be associated such that attachment of the mandrel to a larger unit that may, for example, be a stand alone highway vehicle, or an element of a larger stand alone device may be affected. It is to be appreciated that bolting of the mandrel to the labyrinth ring and drive shaft may occur prior to assembling a blade head assembly or that a blade head assembly may first be configured and assembled and then be mounted to a drive shaft and labyrinth ring. An example method is discussed later in relation to FIG. 10. It should be understood and appreciated that any alternative attachment mechanism as conventional in the art is contemplated within the scope of the present innovation.

Piece 602 may also comprise a shoulder 608 with an inner surface 610. The sleeve of Piece 602 (shown as an alternative unnumbered separate item) may have an outer diameter 612, sized to accommodate an inner diameter of blade elements and spacers, as in example system FIGS. 1-5 and as will be discussed in detail below in relation to FIGS. 7-8. Inner surface 610 provides a mostly or substantially planar surface for which a lateral edge portion of blade elements (or depending on predetermined configuration, a spacer) may abut.

Mandrel assembly 600 may also comprise Piece 614. Piece 614 may mate with Piece 602 (or alternatively the unnumbered sleeve that mates with Piece 602) with reference to the keyway 604, and may share an outer diameter 612 along the mating portion. Piece 614 may also have a shoulder 616, which may create a surface 618. Depending on the predetermined configuration, surface 618 also advantageously abuts either a last blade element or a last spacer of a blade assembly, for example, a blade assembly like those in FIGS. 1-5. When mandrel assembly 600, with a predetermined number of blade elements, or blade elements and spacers, has Piece 614 mounted to Piece 602, attachment elements, for example, bolts (624) may be used to attach the mandrel pieces and provide a transverse force to the blade elements or blade elements and spacers. The predetermined configuration results in a width 620 that may constitute a material removal working zone. It is to be appreciated that width 620, depending on predetermined configurations, may involve a plurality of multiple widths of actual material removal zones that may be the same or different, and may be spaced as desired, with most any desired gap widths), related to a potential material removal application, and an overall width 622 that may be contained within a housing of a larger vehicle or device (not shown).

The disclosed innovation has been found to improve the overall balance of the grinding and/or cutting system, with the blade assembly having reduced overall vibration, reduced vibration at the grinding and/or cutting blade segments, increased stiffness in the blade assembly, increased performance and increased life expectancy of the blade assembly and blade elements. This is in part due to the material-to-material contact in the lateral core zones between adjacent blade elements wherein virtually the entire blade core zone engages an adjacent blade core zone. Such configurations may increase the overall stiffness of the blade assembly and thus reduce vibration. Moreover, having blade cores with material-to-material contact and a continuous outer surface eliminates, or substantially eliminates, voids between blade elements, or alternatively between blade elements and spacers, and thus prevent dirt, debris, or other material from collecting between blade elements or damaging the mandrel. Preventing debris collection between blade elements provides at least in part some reduced vibration of the blade assembly. Other embodiments of blade elements may have increased thicknesses, which may improve overall rigidity and stiffness of the blade assembly, and thereby improves overall functionality. Increased rigidity and stiffness may provide both a better grind and/or cut and may improve abrasive longevity. Thus, the disclosed innovation reduces costs and increases performance and longevity of the tool.

Figures 7A, 7B:
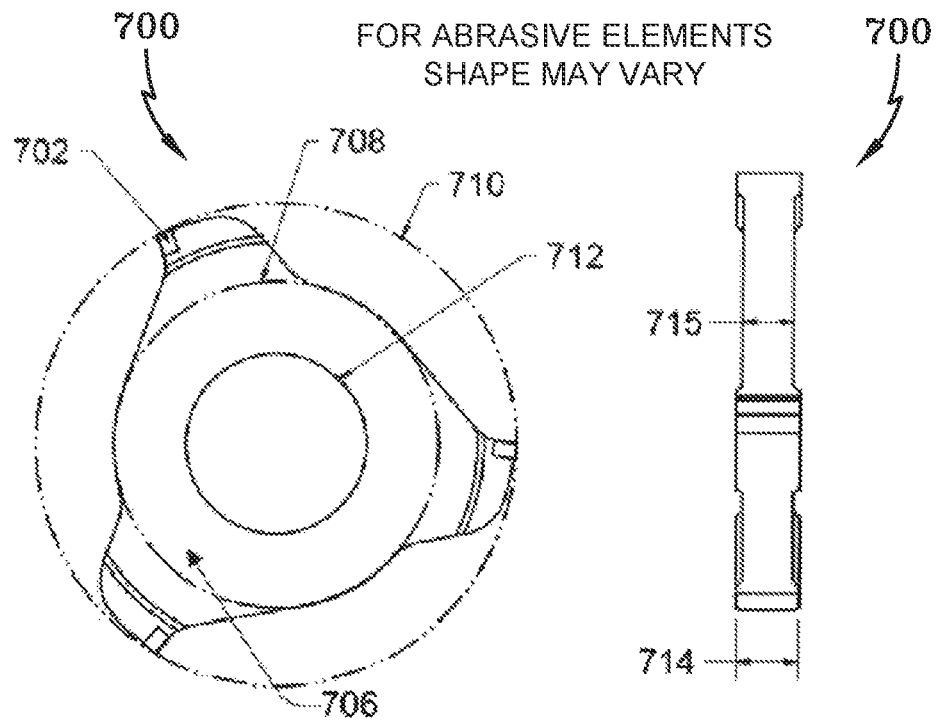
FIGS. 7A-7C present, respectively, side, front, and isometric views of a manufacture according to aspects of the innovation.
Figure 7C:
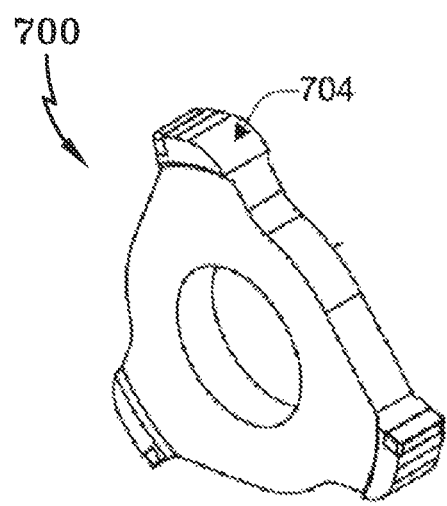

Turning now to FIGS. 7 and 8, examples of manufactures of blade elements are shown and disclosed. Blade element 700 of FIG. 7 is shown in side, front and isometric views. The example embodiment featured here includes an abrasive section 702 that is permanently affixed to the shoulder portion 704 which then transitions to a body portion 706. It should be understood and appreciated, as explained further below, that abrasive section 702 may be provided in at least one instance, or may be provided in a plurality of instances. The embodiment pictured in FIGS. 7A-C show an example of three instances. It should also be understood and appreciated that more than one abrasive section 702 may be employed in connection with a single shoulder portion 704.

The variety of overall configuration of multiple abrasive sections 702, such as but not limited to side-by-side in a horizontal orientation or in a vertical orientation, or some combination thereof, are envisioned to be within the scope of the innovation. It should still further be appreciated that abrasive section 702 may comprise most any material conventional in the art, such as but not limited to, a polycrystalline diamond (PCD) material. More specifically, abrasive section(s) 702 may be, but not limited to, a polycrystalline diamond compact (PCD), as known and understood in the art. Still further, it should be appreciated and understood that abrasive section 702 (or a plurality thereof) may comprise most any shape, such as but not limited to, round, square, rectangular, triangular, hexagonal, polygonal, hemispherical, truncated versions of the foregoing, and the like, or a combination thereof. Assembly of blade elements, such as blade element 700 with a mandrel assembly is discussed later in relation to FIG. 10. The innovation discloses that outer circumference 708 of thickness of body portion 706 effectively creates Zone 1 in a head assembly. Blade element 700 may have a plurality of, such as 1 to M, shoulder portions 704, where M is an integer. Shoulder portions 704 may each have a material removal (for example, a grinding and/or cutting) portions 702. Some embodiments may have the material removal portions 702 integrated into the shoulder (such as blade element 700) while other embodiments may have the material removal portions 702 non-integral to the shoulder (such as blade element 800 as will be discussed in relation to FIG. 8). It is to be appreciated that the plurality of material removal portions 702 are secured relative to the blade shoulder 704 at about a predetermined radial distance 710, from a center axis as determined from center of inner diameter 712 creating a predetermined circumferential material removal zone. It is to be appreciated that inner diameter 712 is sized to mate with an outer diameter of a mandrel sleeve cylindrical portion for example, mandrel assembly 600, outer diameter 612, as shown in FIG. 6, which mandrel cylindrical portion forms a perpendicular axis of a blade assembly.

The example embodiment of blade element 700 indicates that an abrasive element 702 may be permanently affixed to a mounting 704 and the mounting 704 permanently affixed to a shoulder portion 706. Shown as an example is an approximately rectangular abrasive element 702 set into a mounting 704. It is also to be appreciated that mounting 704 may be a variety of shapes as may be desired and as may be contemplated in the art and informed upon reading this disclosure. It is to be appreciated that the types of permanent mounting 704 is not a limitation on the innovation disclosed. It is to be appreciated that at least a portion of the shoulder portion 706 will have a thickness 714 that is thicker than body portion thickness 715.

The number of shoulders 706 containing grinding and/or cutting portions 702 may vary from one to M, where M is an integer and a number that may be determined by application of material to be removed as well as the desired relative sizes of the portion and the size of the diameter of the blade. For embodiments with larger diameter blades (such as for example in the upper range of 20 to 30 inches), it is to be appreciated that this can include dozens of shoulders 706 containing grinding and/or cutting portions 702 circumferentially spaced about predetermined diameter 710. Diameter 710 provides a material working zone, and it is to be appreciated that a plurality of such material working zones may be provided with individual blade elements 700 having a plurality of dimensions 710, as for example, disclosed in relation to FIG. 5. Further, it is to be appreciated that blade elements may be provided in a wide range of diameters wherein the disclosed innovation is not to be limited to any particular size or type of grinding and/or cutting blade. Blade element 700 of FIG. 7 is shown as having M=3 shoulders. In an alternative embodiment, blade element 1202 of assembly 1200 (FIGS. 12A-12H) is shown having M=12 shoulders. As shown therein, each shoulder 1204 of an individual blade 1201 comprises a single abrasive section 1206 arranged circumferentially around the outer periphery of blade 1202. It should be appreciated that each abrasive section 1206 may be arranged in an identical orientation to each other, or alternatively may be arranged in an offset orientation from a following/previous abrasive section, such as offset by an angle in the range of 1-45 degrees offset to the left or right of center, or more particularly in the range of 10-30 degrees offset to the left or right of center for advantageously increasing the cutting/grinding/abrasive footprint without increasing the width of the blade and/or without adding additional blades to the overall assembly configuration. As shown therein, each blade 1201 is separated by an adjacent blade by at least one spacer, such as four adjacent spacers 1208.

In yet an alternative embodiment, blade element 1302 of assembly 1300 (FIGS. 13A-13G) is shown having M=30 shoulders. As shown therein, each shoulder 1304 of an individual blade 1301 comprises a single abrasive section 1306 arranged circumferentially around the outer diameter periphery of blade 13202. It should be appreciated that each abrasive section 1306 may be arranged an identical orientation to each other, or alternatively may be arranged in an offset orientation from a following/previous abrasive section, such as offset by an angle in the range of 1-45 degrees offset to the left or right of center, or more particularly in the range of 10-30 degrees offset to the left or right of center. As described above, each blade 1301 may be separated from an adjacent blade by at least one spacer, or as shown therein no spacers may be employed in which case each blade 1301 is substantially in contact and flush with an adjacent blade 1301.

Turning now to FIGS. 8A-8C, another example embodiment of a blade element is shown. Blade element 800 highlights an embodiment featuring an abrasive element 802 that is replaceable and exchangeable. The abrasive element 802 is attached at a shoulder portion 804 which shoulder portion transitions to a body portion 806. Assembly of blade elements, such as blade element 800 with a mandrel is discussed later in relation to FIG. 10. The innovation discloses a body portion 806 having an outer circumference, the outer circumference of body portion having a thickness 808 effectively creates a continuous outer surface in a head assembly without spacers, or with the outer surface of spacers, a continuous outer surface in a head assembly with spacers. Blade element 800 may have a plurality (1 to M) of shoulder portions 804, where M is an integer. Shoulder portions 804 may each have a grinding and/or cutting portions 802. Some embodiments may have the grinding and/or cutting portions 802 integrated into the shoulder 804 (such as blade element 700) while other embodiments may have the grinding and/or cutting portions 802 non-integral to the shoulder (such as blade element 800). It is to be appreciated that the plurality of grinding and/or cutting portions 802 are secured relative to the blade shoulder 804 about at a predetermined radial distance 810, from a center axis as determined from center of inner diameter 812 creating a predetermined circumferential material removal zone. It is to be appreciated that inner diameter 812 is sized to mate with an outer diameter of a mandrel sleeve cylindrical portion for example, mandrel assembly 600 outer diameter 612, as shown in FIG. 6, which mandrel cylindrical portion forms a perpendicular axis of a blade assembly.

The number of shoulders containing grinding and/or cutting portions 802 may vary from one to M, where M is an integer and a number that may be determined by application of material to be removed, as well as the desired relative sizes of the portion and the size of the diameter of the blade. For embodiments with larger diameter blades, it is to be appreciated that this can include dozens of shoulders containing grinding and/or cutting portions 802 circumferentially spaced about predetermined radial distance 810. Further, it is to be appreciated that blade elements may be provided in a wide range of diameters wherein the disclosed innovation is not to be limited to any particular size or type of grinding and/or cutting blade. Blade element 800 of FIGS. 8A-8C is shown as having M=4 shoulders. In another embodiment, 10 shoulders with corresponding cutters may be employed in accordance with the present innovation.

The example embodiment of blade element 800 indicates that an abrasive element 802 may be permanently affixed to a mounting and the mounting removably affixed to a shoulder portion. FIGS. 9, 10A and 10B illustrate some examples of other embodiments of the disclosed innovation in configurations of the removable abrasive section. While the removable mounting is shown to be screw and key arrangement, it is to be appreciated that the types of removable mounting is not a limitation on the innovation disclosed.

In embodiments as shown in FIGS. 7 and 8, abrasive portions attached to shoulders are shown as centered along the thickness dimension of the blade element. While not shown, this centeredness is merely indicative on one set of embodiments. Other embodiments may provide the abrasive portion offset from center in either direction from the centerline of the thickness dimension. In other words, abrasive sections, while pictured symmetrical to the blade element body, may be provided in an unsymmetrical manner (not shown), shifted either left or right of a blade element center line. For example, in an embodiment, abrasive segments may be shifted beyond a side edge of the blade cores to produce a side clearance. In other embodiments, the disclosed innovation may be configured with abrasive sections of differently shifted blade elements, and even abrasive sections of an individual blade element may have differently shifted sections along the periphery of the blade element.

Figure 9A:
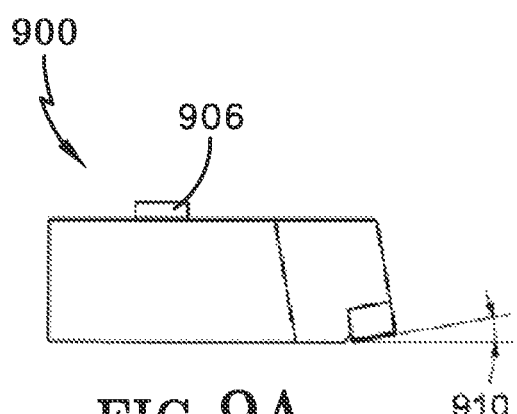
FIGS. 9A-9D present, respectively, side, isometric, top, and end views of an abrasive element according to aspects of the innovation.
Figure 9B:
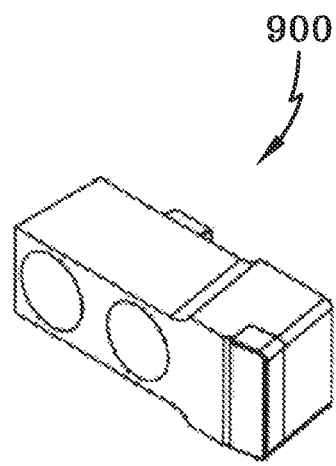
Figure 9C:
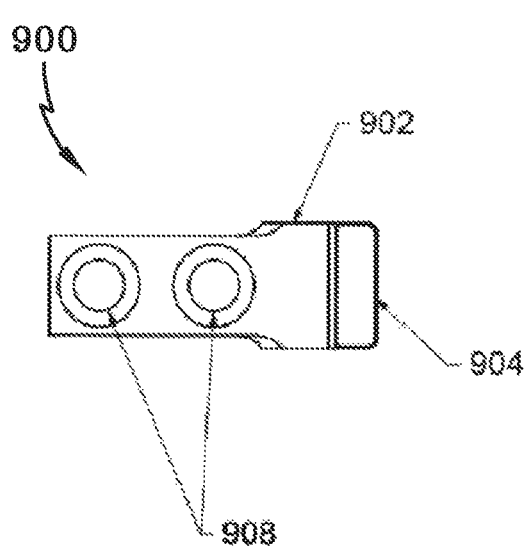
Figure 9D:
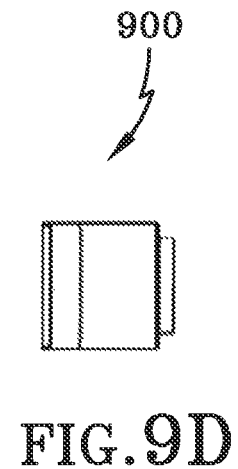
Figures 10A, 10B:
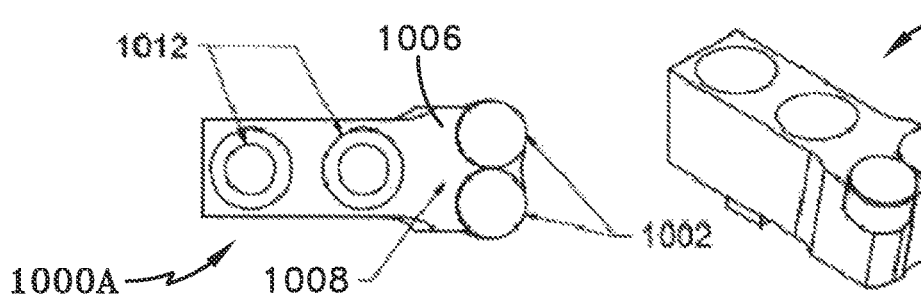
Figures 10C, 10D:
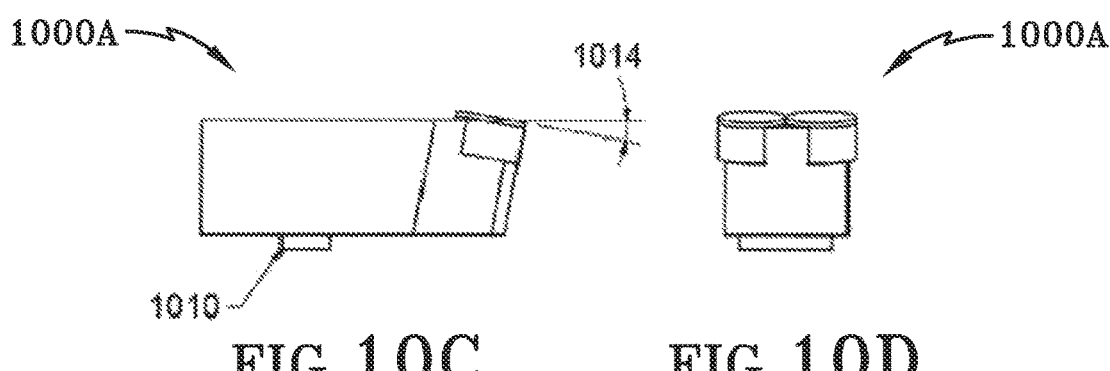
Figures 10E, 10F:
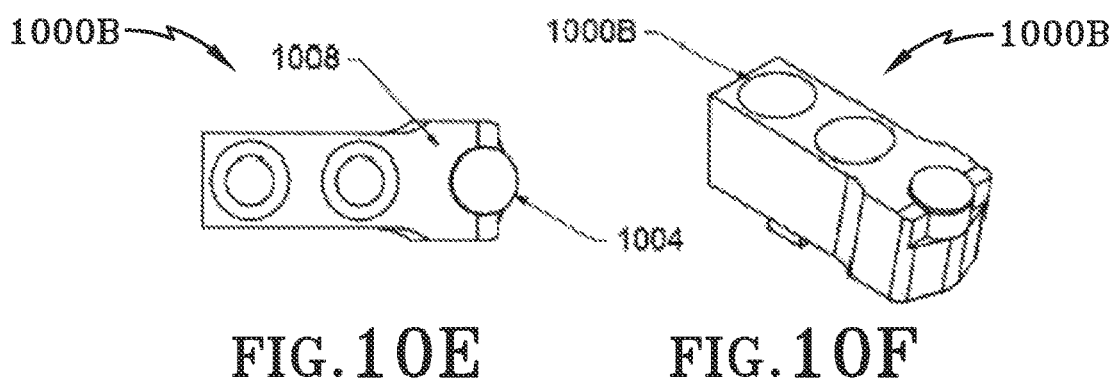
FIGS. 10E-10H present, respectively, side, isometric, top, and end views of a "single" abrasive element 1000B according to aspects of the innovation.
Figures 10G, 10H:
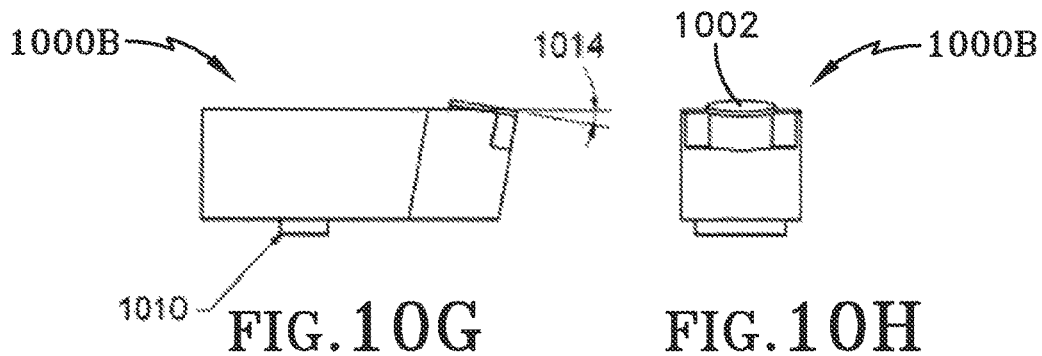

Transitioning to FIGS. 9A-9D, shown is an example embodiment 900 of a removeable/replaceable abrasive element according to additional aspects of the disclosed innovation. As discussed previously, it is to be appreciated that abrasive element may also advantageously be a non-removable abrasive element. An abrasive element is shown to comprise a holder portion 902 and an abrasive portion 904. A holder portion 902 may have a tongue 906 that may fit a corresponding groove in a shoulder portion of a mating blade element, for example, blade element 700 of FIG. 7 (not shown therein). Holder portion may also have attachment mechanisms 908, for example, holes for screws, bolts, and the like (not shown). Alternatively or in addition, holder portion 902 may also be fashioned to receive a permanently mounted abrasive 904. The permanently amounted abrasive 904 may be of various shapes, such as round, rectangular, etc., and compositions, such as polycrystalline diamond (PCD), and the attachment of the abrasive may be according to most any number of methods known in the art. Notwithstanding that a person having ordinary skill in the art may know how to attach an abrasive 904 to a holder 902, the disclosed innovation includes aspects that have been found to provide advantages over known articles in the art. For example, as shown in FIGS. 9A-9D, an abrasive 904 is attached to a holder 902. The abrasive 904 may be attached at a swept back angle 910 from a top plane. It is appreciated that this angle 910 may be chosen based at least upon a designated end use of various designs related to a variety of surface materials to be worked and removed. For a non-limiting example, angle 910 may be in the range of 0-45 degrees, or more particularly in the range of 10-30 degrees, relative to the horizontal plane (FIG. 9A). Further, the abrasive 904 may be chamfered at each corner of the leading edge, as well as from the inclined plane edge towards the three vertical edges. It is to be appreciated that chamfering and other design changes of abrasive 904 are to be considered to be within the scope of the innovation.

Figure 16A:
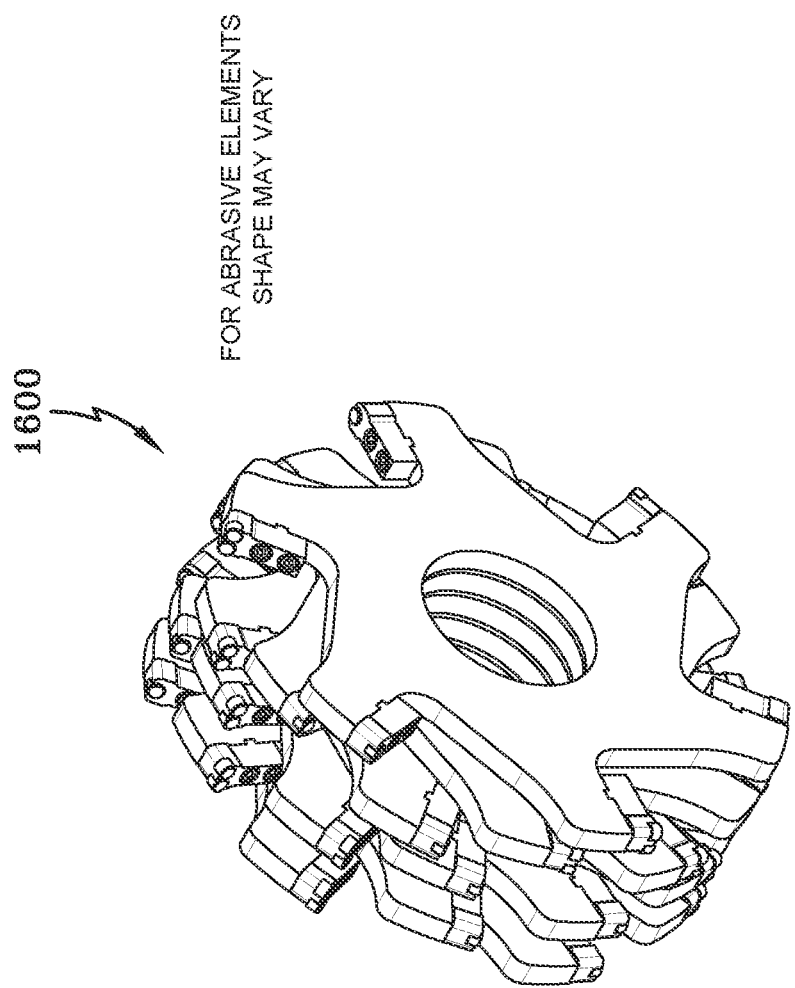
FIGS. 16A-16G present various views of still yet another additional embodiment of an assembly according to the present innovation.
Figure 16D:
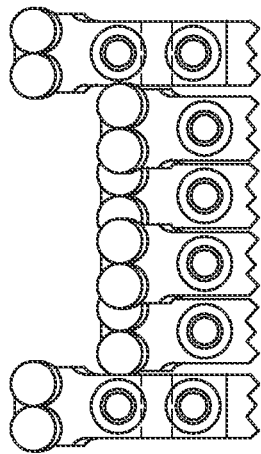
Figure 16C:
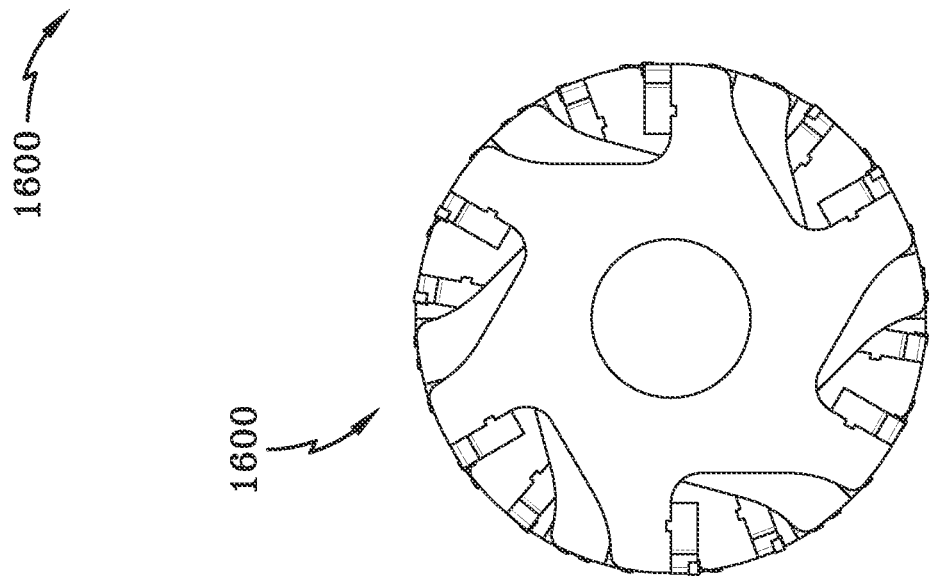
Figure 16B:
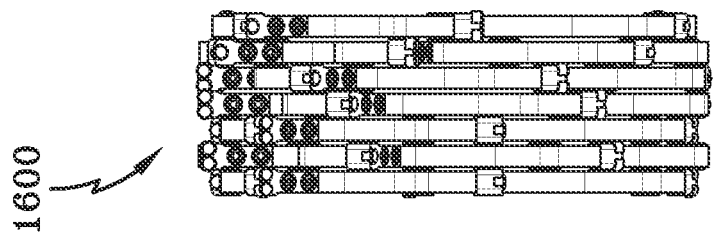
Figure 16G:
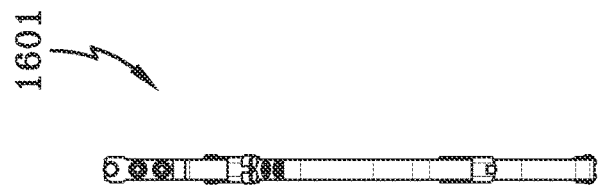
Figure 16E:
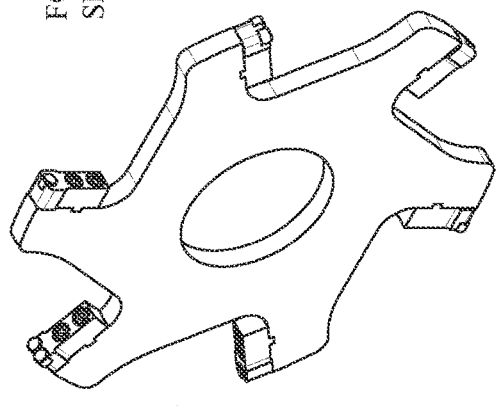
Figure 16F:
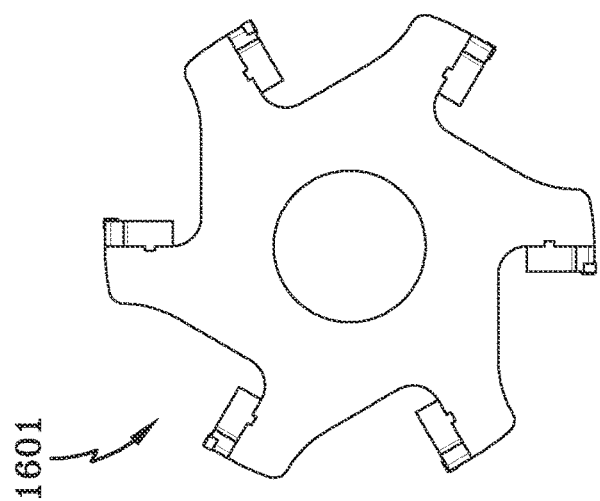

Turning to FIGS. 10A-10H, additional example embodiment 1000A and 1000B of a removable/replaceable abrasive element according to aspects of the disclosed innovation are presented in side, front and isometric views. It has been determined that mounting each of abrasive element 1000A and 1000B successively in a single-then-double arrangement (i.e., a single abrasive element on a single holder followed by at least two abrasive elements on a single holder, or alternatively at least two abrasive elements on a single holder followed by a single abrasive element on a single holder) in a blade element, for example, blade element 700 as discussed in FIG. 7, increased overall effectiveness of material removal for certain materials, particularly, asphalt. For example, one such alternative embodiment which depicts such an arrangement in accordance with the present innovation is shown in FIGS. 15A-15G which shows an assembly 1500 comprising multiple blade elements 1501. As shown therein, the assembly 1500 comprises at least one blade element having a single-then-double arrangement of abrasive elements, at least one blade element having a single abrasive element on each holder, and at least one blade element having at least two abrasive elements on each holder. Also for example, another such alternative embodiment which depicts such an arrangement in accordance with the present innovation is shown in FIGS. 16A-16G which shows an assembly 1600 comprising multiple blade elements 1601. As shown therein, the assembly 1600 comprises at least one blade element having a single-then-double arrangement of abrasive elements, at least one blade element having a single abrasive element on each holder, and at least one blade element having at least two abrasive elements on each holder. Alternatively, each blade may comprise at least one abrasive element on each holder for addressing various depths of a target grinding location, or more particularly at least two abrasive elements on each holder (FIG. 16D). It is to be appreciated that abrasive elements 1000A and 1000B provide a more durable abrasive due at least in part to the fully cylindrical shape of the abrasives, with the twin abrasives 1002 of 1000A each removing a substantial portion of material being worked during the pass of the manufacture on the worked surface, while the abrasive 1004 in 1000B, following the twin abrasives 1002, serves to remove the weakened mid portion of the worked material. Abrasive elements 1000A and 1000B are shown to comprise a holder portion 1006, 1008 and the aforementioned abrasive portions 1002 and 1004. Holder portions 1006, 1008 may have a tongue 1010 that may fit a groove in a shoulder portion of a mating blade element, for example, blade element 700 of FIG. 7. Holder portion may also have attachment mechanisms 1012, for example, holes for screws, bolts, and the like (not shown). Holder portions 1006, 1008 may also be fashioned to receive a permanently mounted abrasive 1002, 1004. It should be appreciated that non-permanently mounted abrasive elements 1002, 1004 may be employed within the scope of the present innovation. The permanently amounted abrasive 1002, 1004 may be of various shapes and compositions, and the attachment of the abrasive may be according to most any number of methods known in the art. In a particular embodiment, the shape of each abrasive element is cylindrical. Notwithstanding that a person having ordinary skill in the art may know how to attach an abrasives 1002, 1004 to holders 1006, 1008 respectively, the disclosed innovation includes aspects that have been found to provide advantages over known articles in the art. For example, as shown in FIG. 10, abrasive 1002, 1004 may be attached at a swept back angle 1014 from a top plane. It is appreciated that this angle 1014 may change for various designs related to surface material to be worked and removed. Further, in certain embodiments, the abrasives 1002, 1004 may be chamfered around a respective periphery, while in other embodiments, no such chamfer may be provided.

Turning now to an embodiment similar to as discussed previously in FIG. 10, an embodiment with truncated circular abrasive elements is disclosed at FIGS. 14A-14E. As is to be appreciated, the attachment of the truncated circular abrasive elements may be as previously discussed. It has been determined that this embodiment may be advantageous for providing material removal in situations designed to have a finer finish. FIGS. 14A-14E depict an additional example embodiment 1400 of a removable/replaceable abrasive element according to aspects of the disclosed innovation is presented in various views. It has been determined that mounting each of abrasive element 1400 successively in a blade element, for example, blade element 700 as discussed in FIG. 7, increased overall effectiveness of material removal for certain materials, such as for example but not limited, flooring, asphalt or concrete. It is to be appreciated that abrasive elements 1400 provide an improved abrasive due at least in part to the truncated circular shape of the abrasives, with the twin abrasives 1402a and 1402b of 1400 each removing a substantial portion of material being worked during the pass of the manufacture on the worked surface, while a following abrasive (not shown; and optionally a single or double abrasive) serves to remove the weakened mid portion of the worked material. It has been advantageously found that a truncated circular shape provides the advantage of the durability and strength of a circular abrasive element, combined with the cutting/grinding footprint of a rectangular abrasive element, such as for example in concrete applications. Abrasive elements 1400 are shown to comprise a holder portion 11406 and the aforementioned abrasive portions 1402. Holder portions 1406 may have a tongue 1410 that may fit a groove in a shoulder portion of a mating blade element, for example, blade element 700 of FIG. 7. Holder portion may also have attachment mechanisms 1412, for example, holes for screws, bolts, and the like (not shown). Holder portion 1406 may also be fashioned to receive a permanently mounted abrasive 1402. The permanently amounted abrasive 1402 may be of various shapes and compositions, and the attachment of the abrasive may be according to most any number of methods known in the art. In a particular embodiment, the shape of each abrasive element is cylindrical or truncated cylindrical. Notwithstanding that a person having ordinary skill in the art may know how to attach an abrasive 1402 to holder 1406, the disclosed innovation includes aspects that have been found to provide advantages over known articles in the art. For example, as shown therein, abrasive 1402 may be attached at a swept back angle relative from a top plane (such as in the range of 10-20 degrees relative to the top plane). It is appreciated that this angle 1414 may optionally change for various designs related to surface material to be worked and removed. Further, in certain embodiments, the abrasive 1402 may be chamfered around a respective periphery, while in other embodiments, no such chamfer may be provided.

Other embodiments of the invention may be provided with a variety of relative thicknesses of an abrasive segment and a blade element thickness. For example, an embodiment may include a blade element that has a blade core thickness and a grinding and/or cutting segment thickness that is less than the core thickness for producing a desired segment-spacing between adjacent segments of a blade head assembly without spacers. In another embodiment, a grinding and/or cutting segment is offset from the blade core to produce a desired segment-spacing between adjacent segments or to create side clearance in a blade head assembly. Appendix A is includes in which additional figures showing embodiments of the present innovation are shown.

Figure 11:
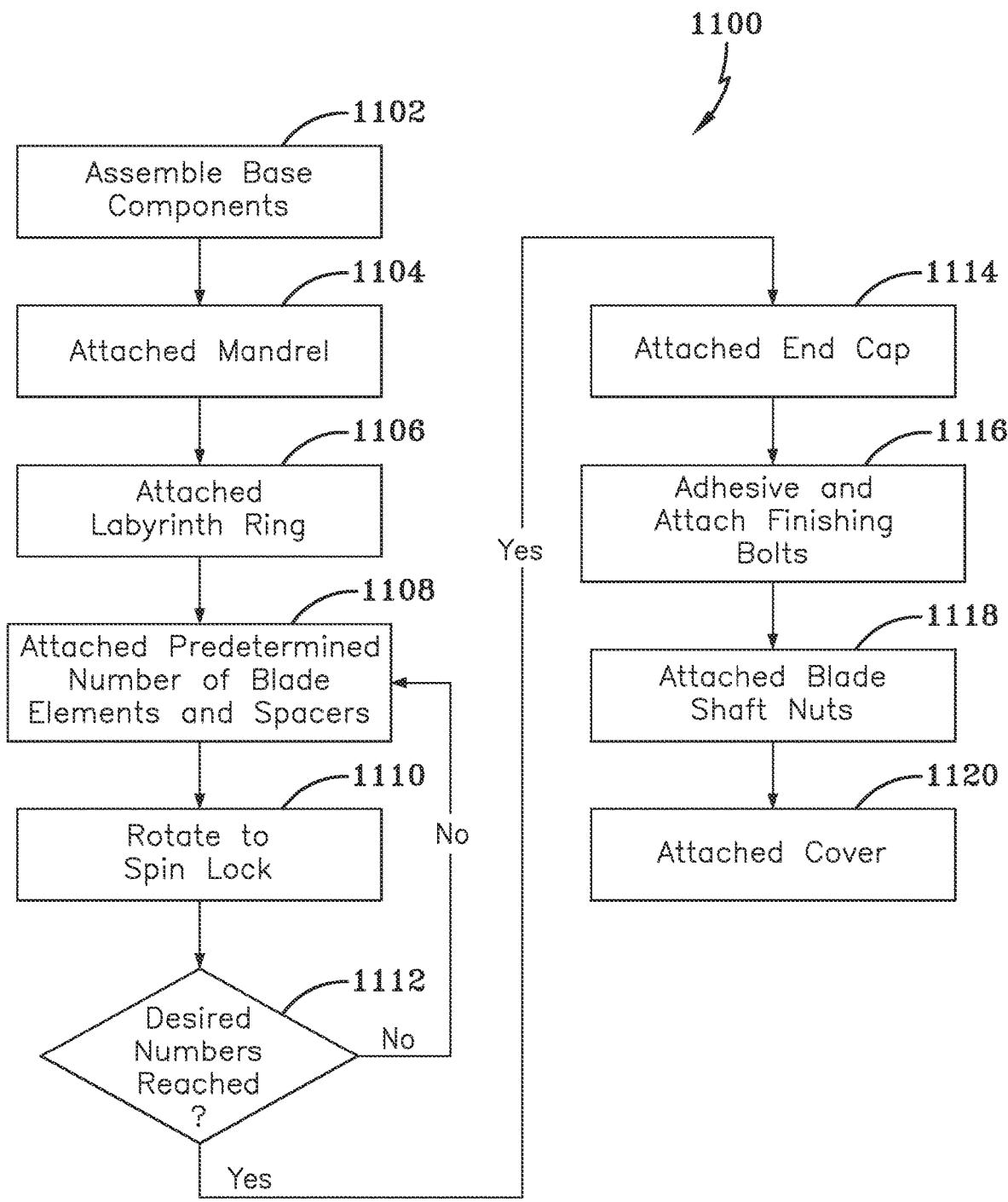
FIG. 11 presents a flow diagram representing a method according to aspects of the innovation
Figure 12A:
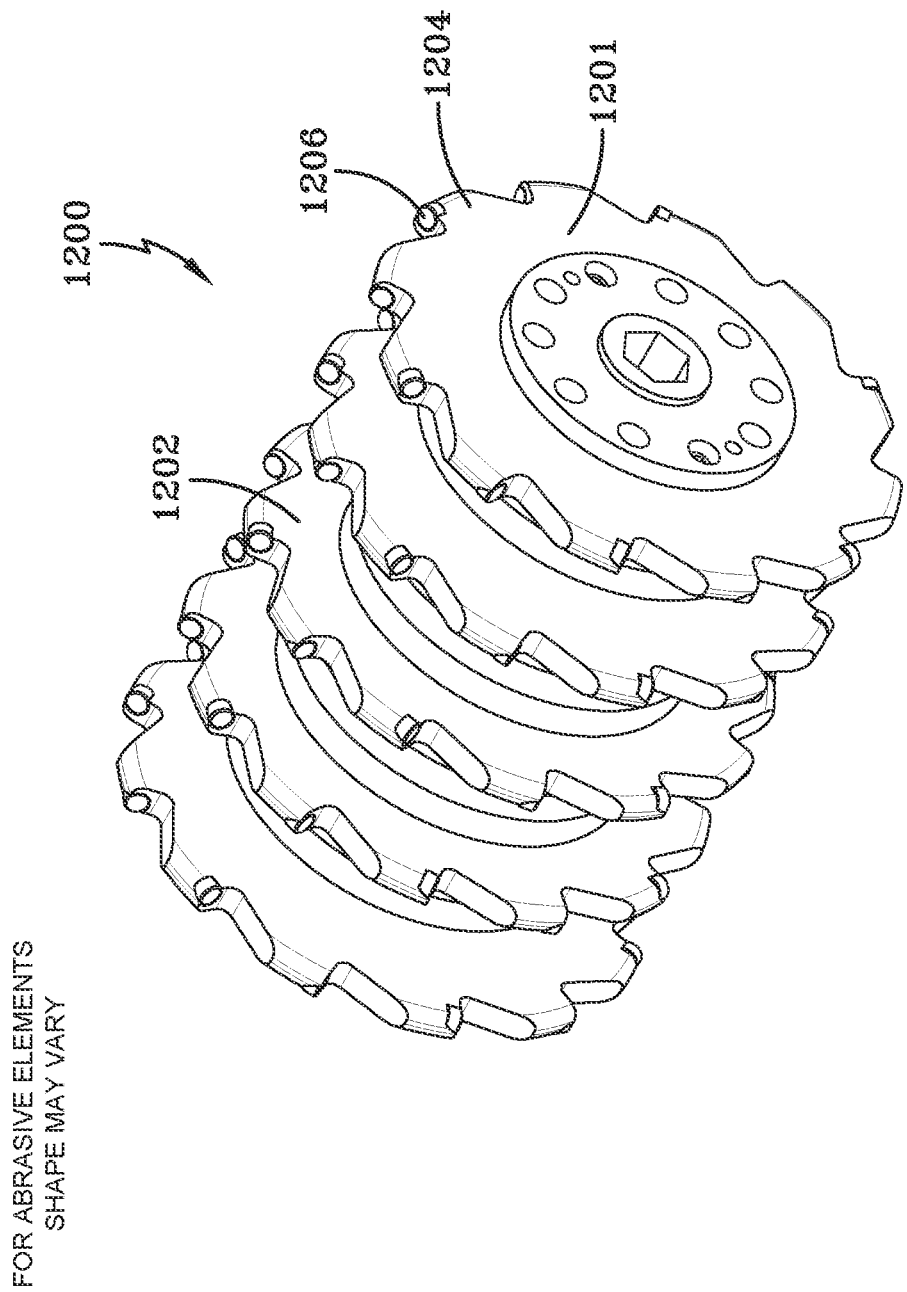
Figure 12F:
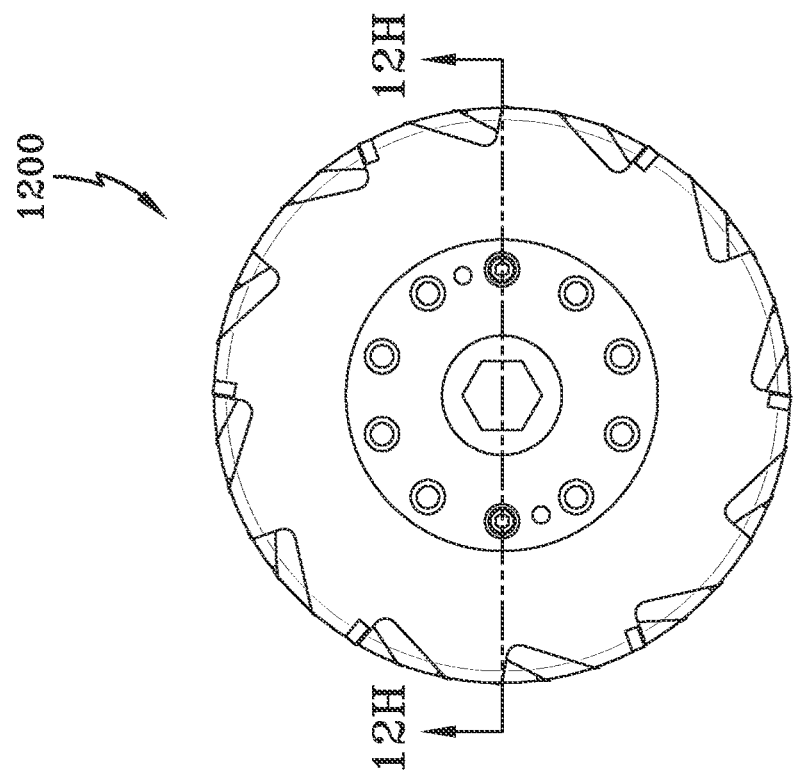
Figure 12B:
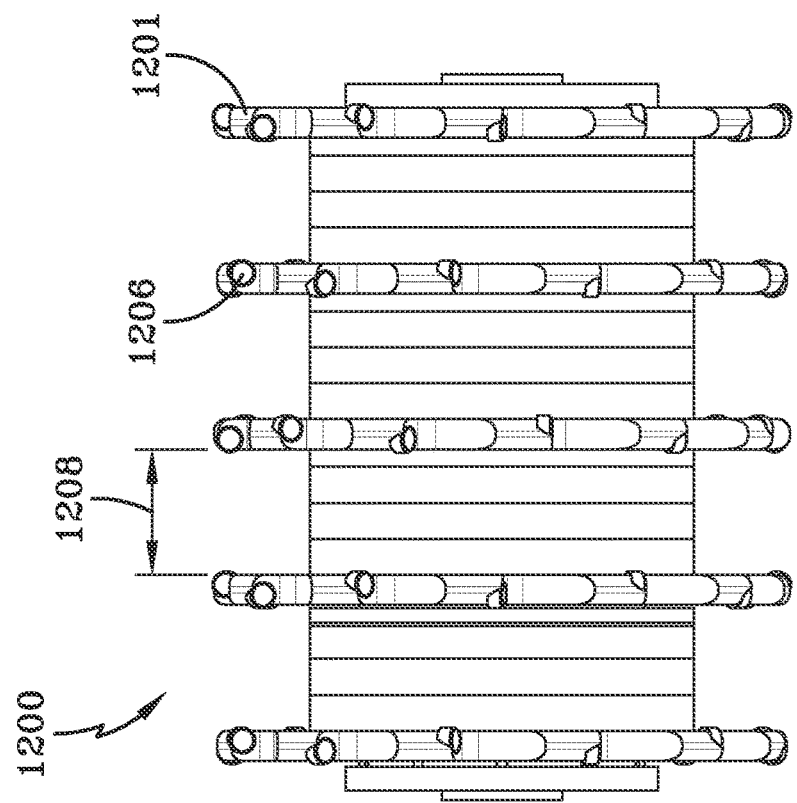
Figure 13B:
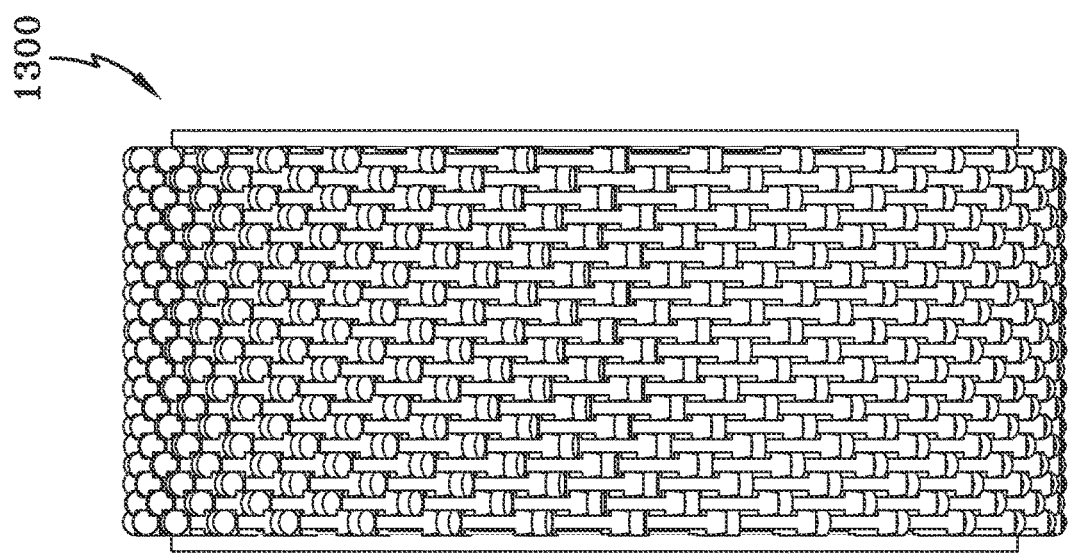
FIGS. 13A-G present various views of another additional embodiment of an assembly according to the present innovation.
Figure 13A:
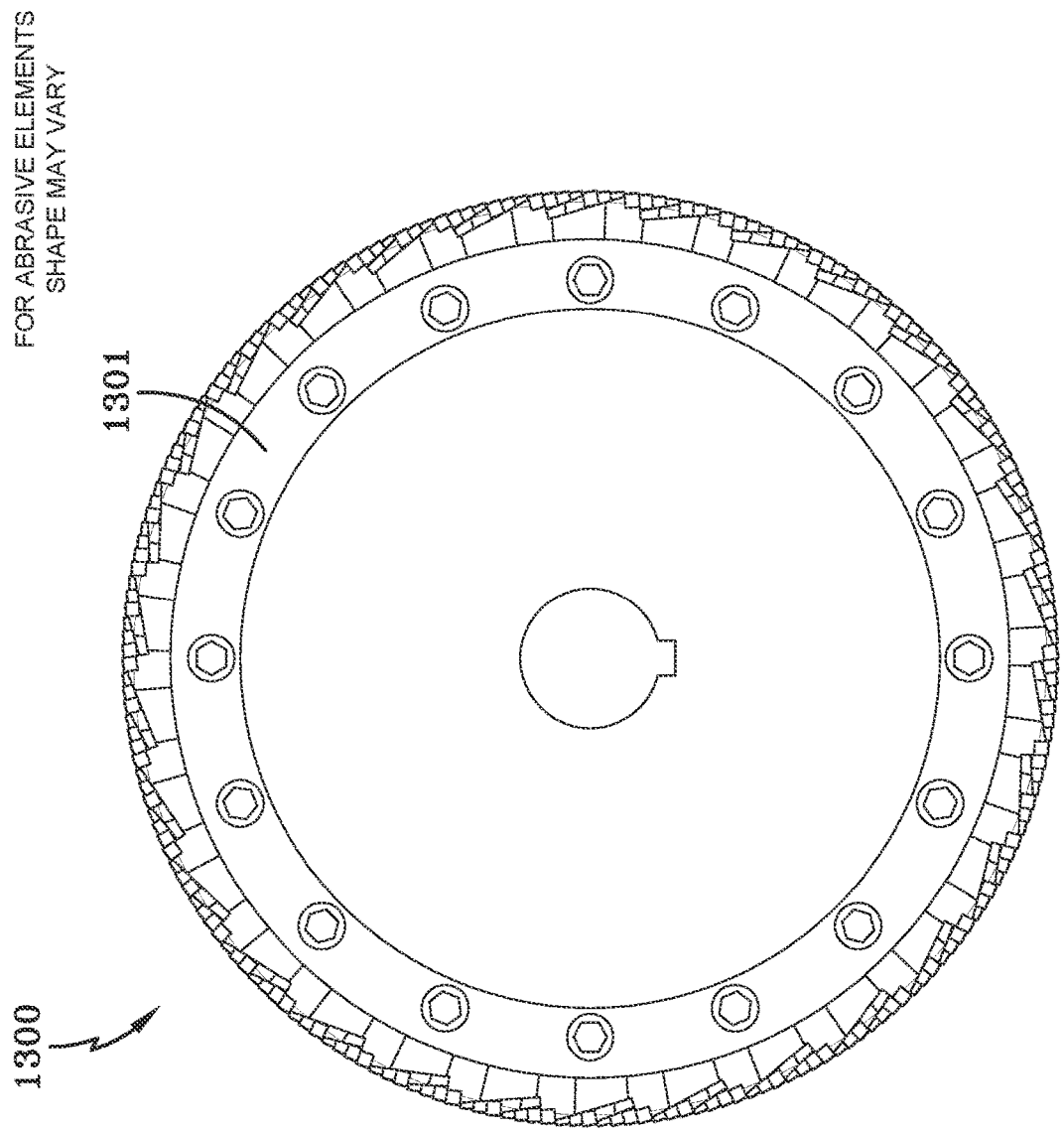
Figure 13C:
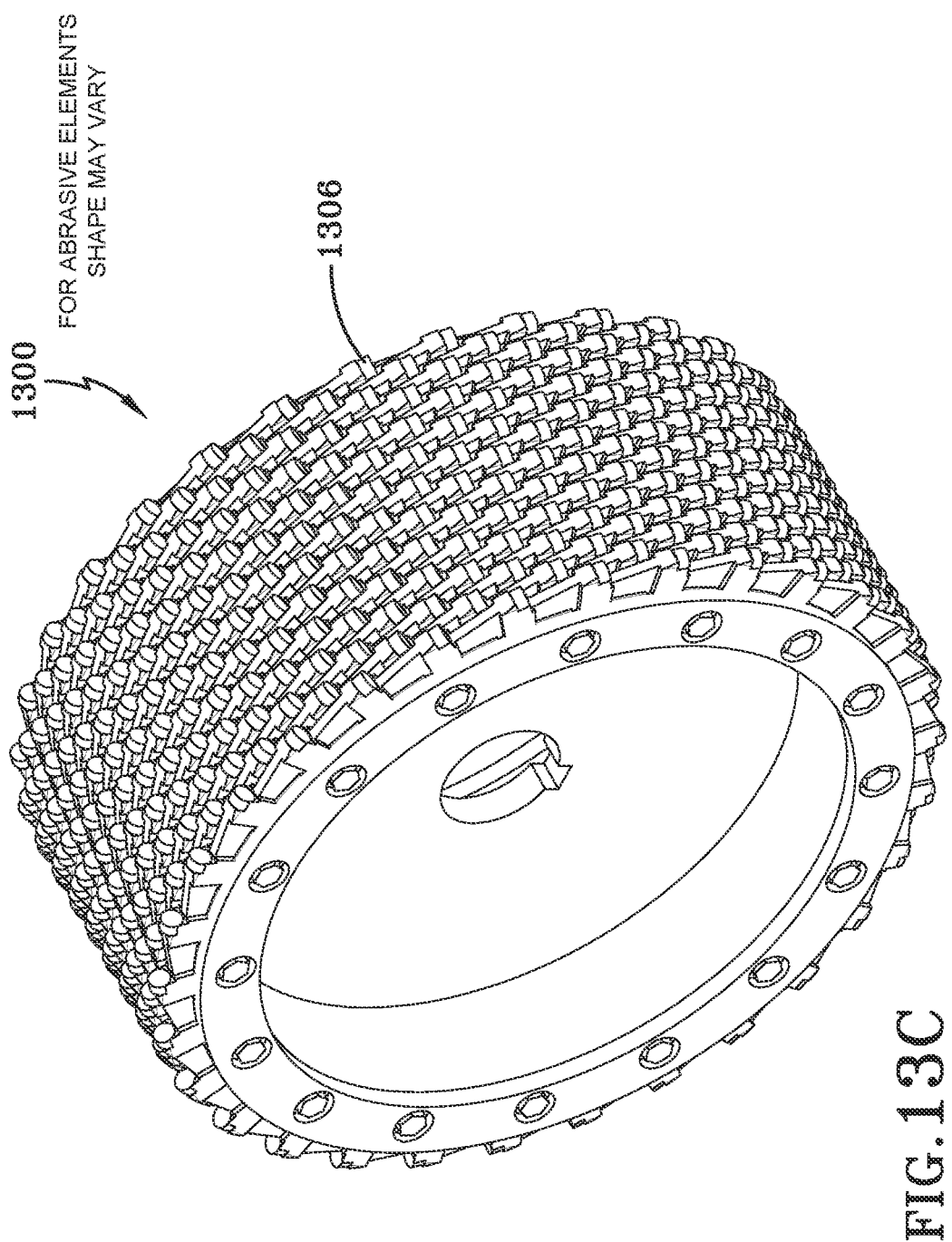
Figure 13E:
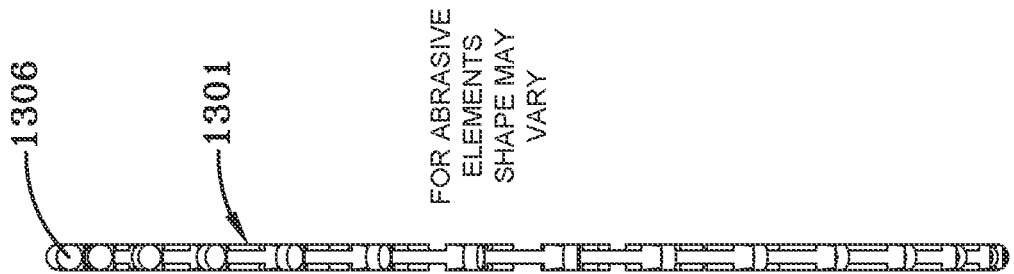
Figure 13D:
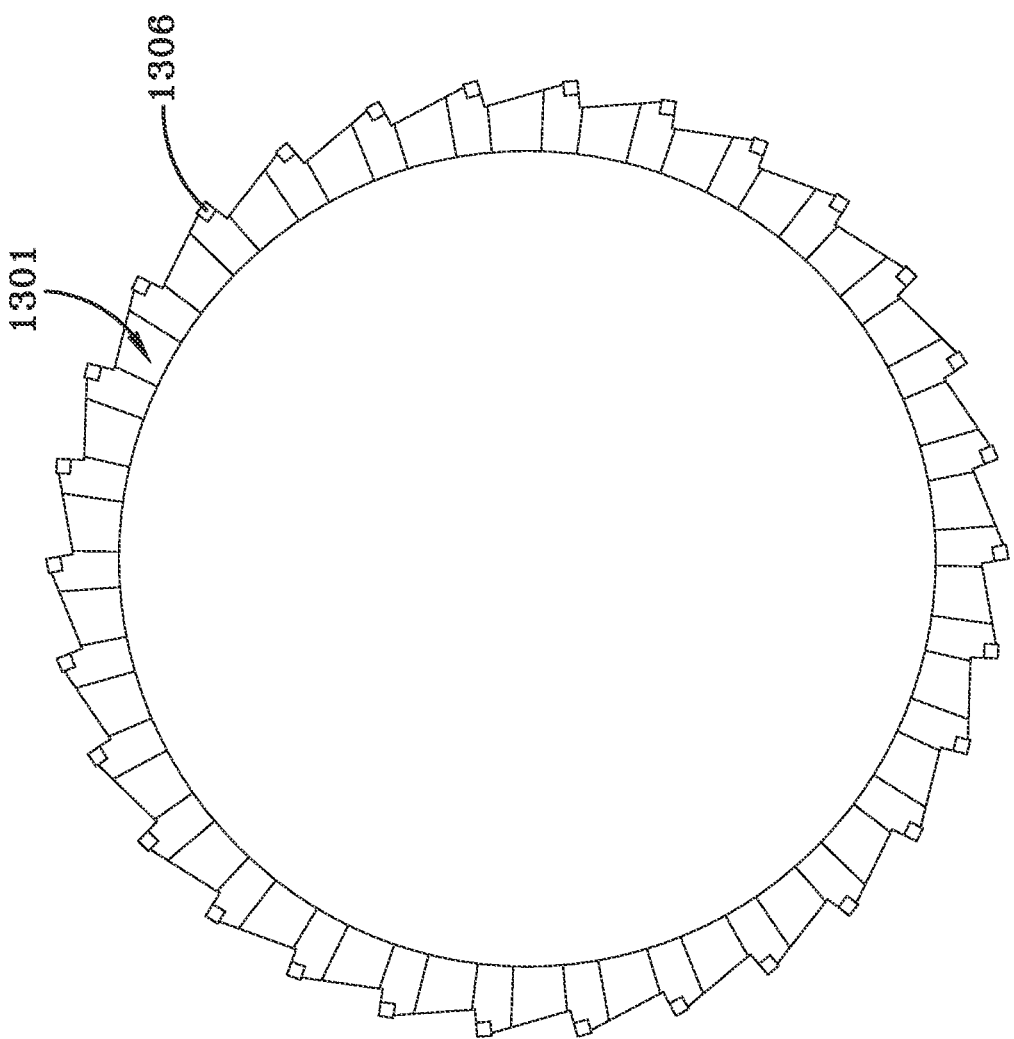
Figure 13F:
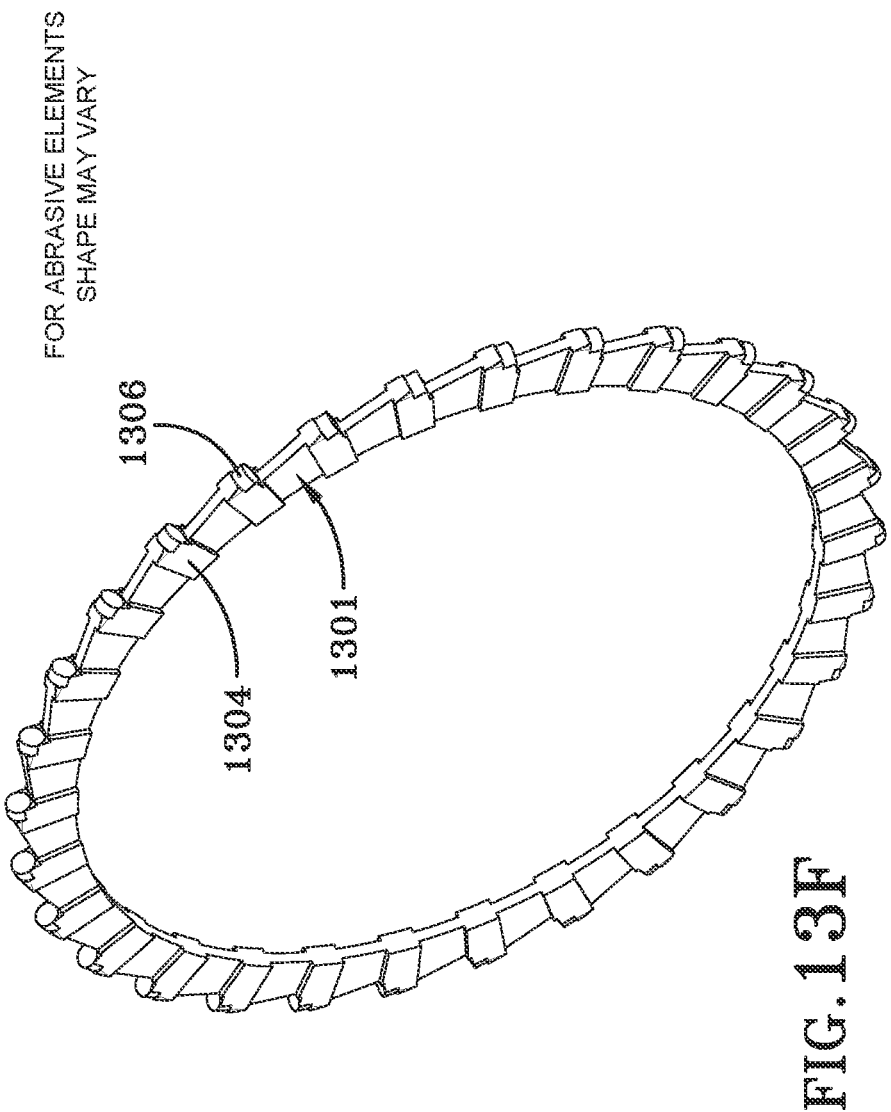
Figure 13G:
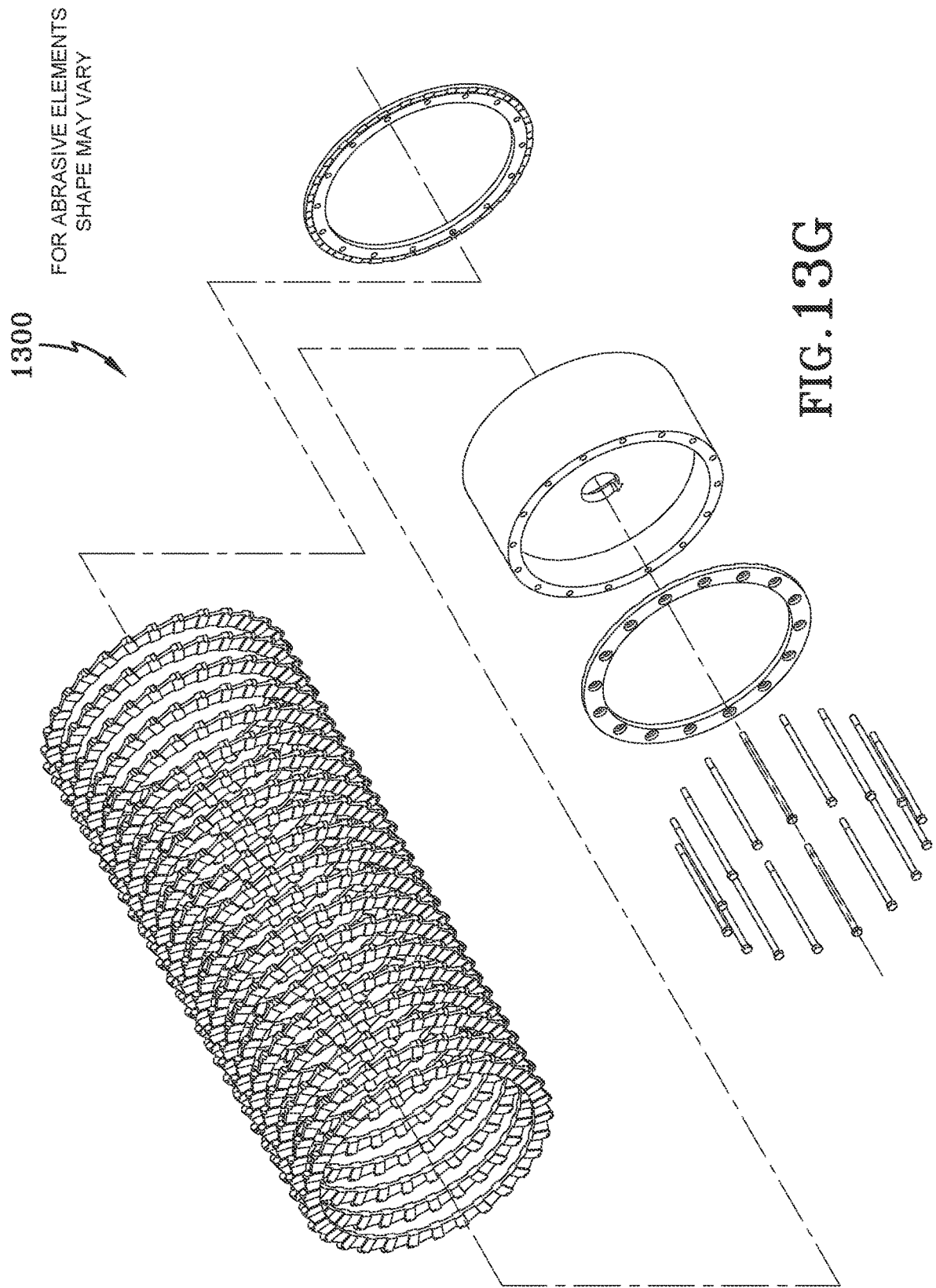
Figure 14A:
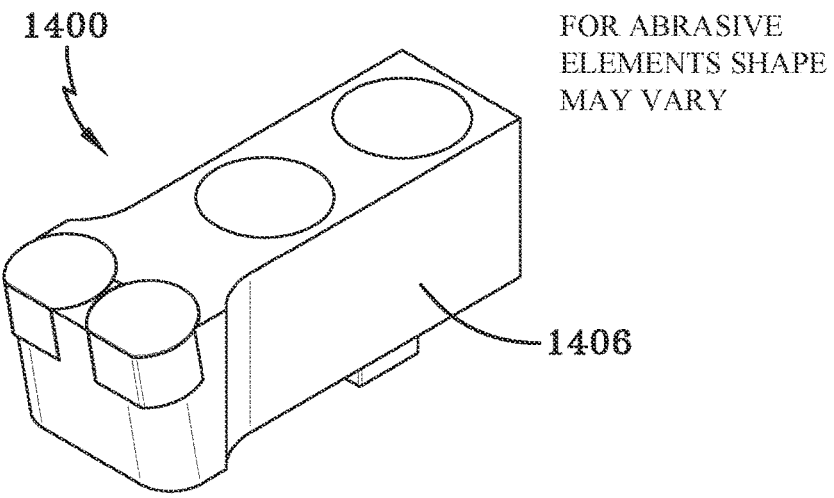
FIGS. 14A-F present perspective, top, and side views of a manufacture according to aspects of the innovation, along with top and side views of an abrasive section for a manufacture according to aspects of the innovation.
Figure 14B:
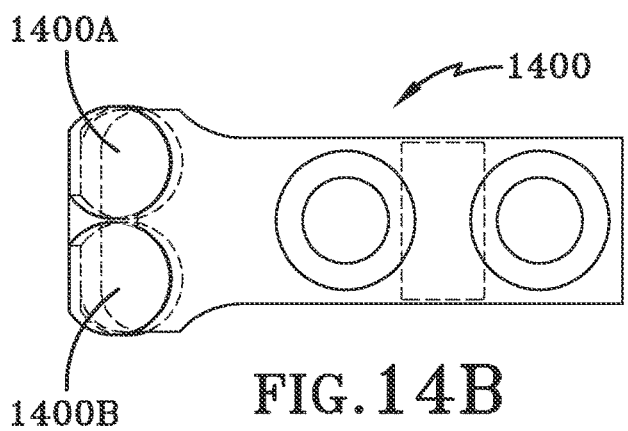
Figure 14C:
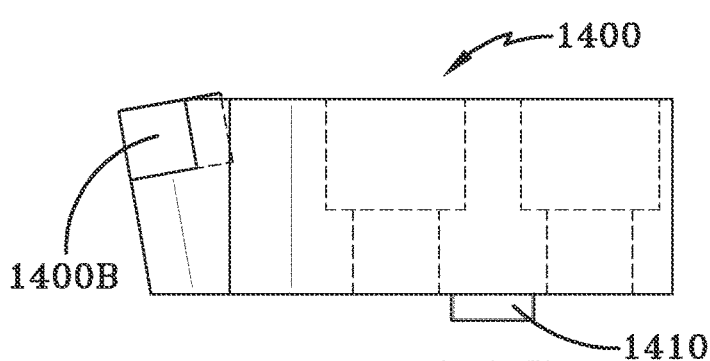
Figure 14F:
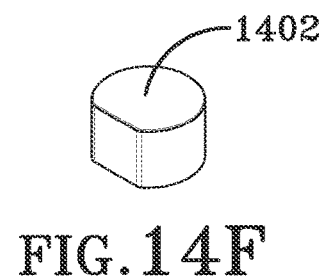
Figure 14D:
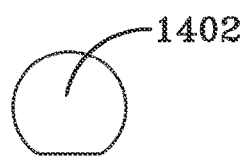
Figure 14E:
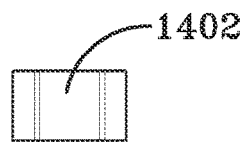
Figure 15A:
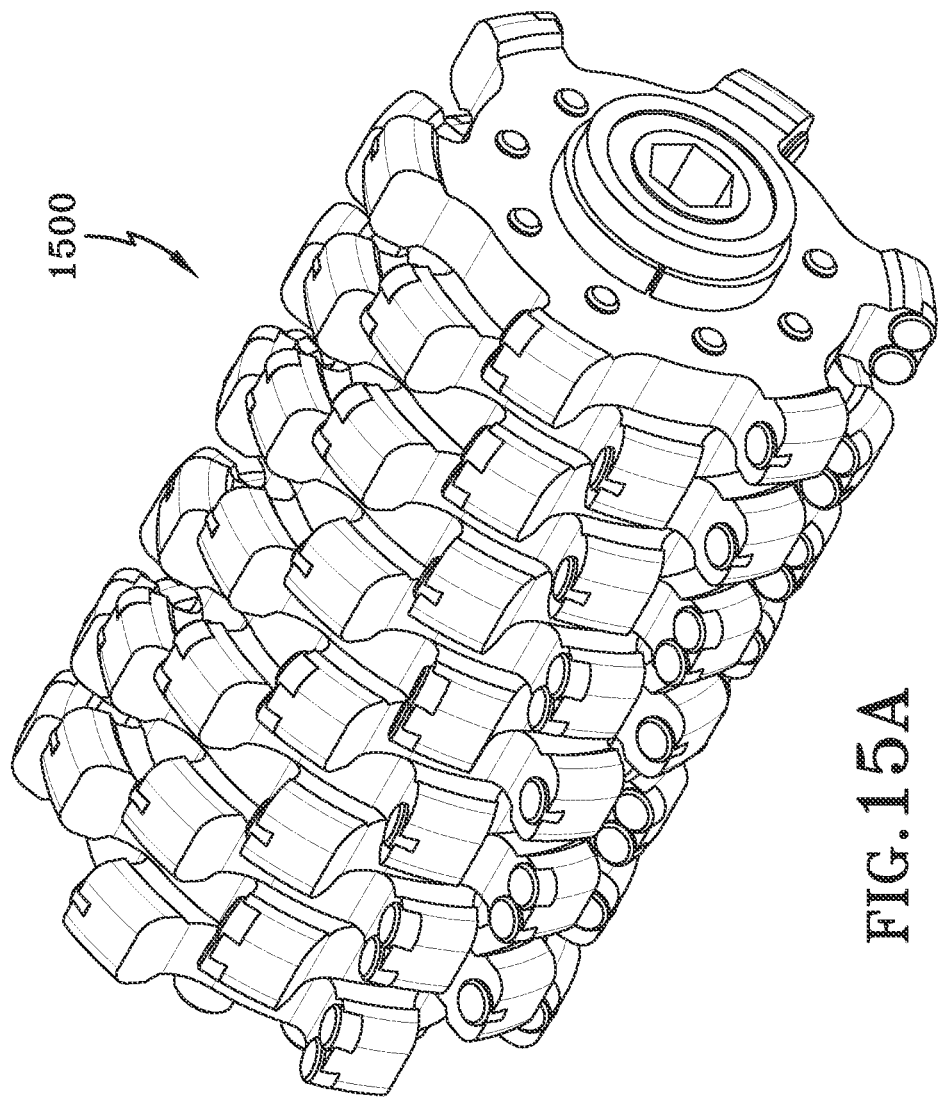
Figure 15E:
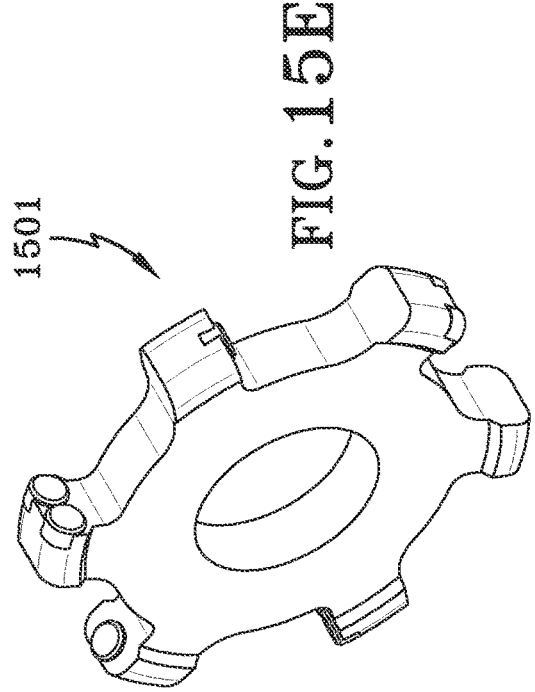
Figure 15G:
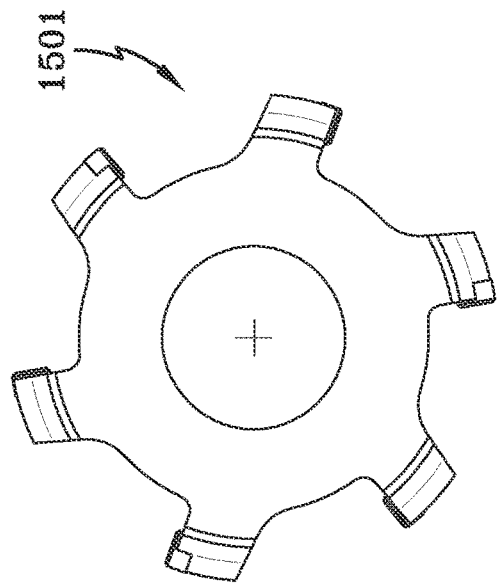
Figure 15F:
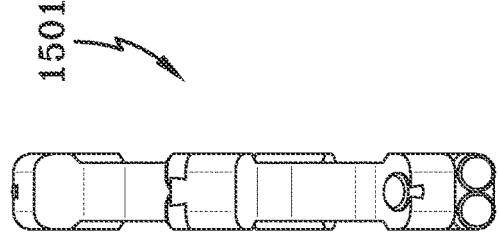

Now turning to FIG. 11, a flow diagram of a method according to an aspect of the invention for assembling a head assembly 1100 is presented. According to flow diagram 1100, method 1100 (or similar embodiments of method 1100) may be used to assemble various embodiments as discussed—herein. At step 1102, starting with a fixed end plate and a drive shaft, a keyway is installed on the drive shaft. At step 1104, a mandrel is slid onto the drive shaft and the keyway. It is to be appreciated that the mandrel is not a milling drum. No portion of the mandrel will be exposed to a material removal zone. At the following step 1106, a labyrinth ring is mounted on the mandrel. The mounting of labyrinth ring interlocks with fixed end plate assembled at step 1102, and the fixed end plate forms a part of the mandrel, creating a shoulder, for example shoulder 608 as discussed in FIG. 6. The end plate may also present a side plane or surface for receiving blade elements, or blade elements and spacers. With reference to the subsequent step 1108, upon the mandrel, blade elements, or blade elements and spacers may be fitted. Each successive item may be slid onto the mandrel in a predetermined sequence fully to the fixed end, the first abutting the labyrinth ring, the next abutting the first. It is to be appreciated that blade elements, or blade elements and spacers will have a tight tolerance with the mandrel, and that use of a rubber mallet or manual rocking while sliding may assist with assembly. At step 1110, in certain embodiments, once a blade element or a spacer has been slid fully towards the end plate and adjacent either to the end plate or to a previously installed blade element, the latter blade element may be rotationally spun around the axis of the mandrel to "lock" the item into a preceding piece with a shoulder portion of one blade element running into a shoulder of a previous blade element. In those embodiments for which shoulder to shoulder overlap occurs in the predetermined sequence of blade elements, or blade elements and spacers, the "lock" provides additional rigidity for a finished head assembly. It is to be appreciated that the rotate to spin lock step may be omitted for those predetermined configurations in which there is no shoulder to shoulder overlap.

An aspect of the innovation is that the predetermined assembly of the plates and/or plates and spacers occurs in a non-symmetrical manner. This non-symmetry reduces harmonics of the completed assembly as that assembly is used in a material removal mode, and provides for greater durability of the finished assembly. Step 1112 determines if desired numbers have been reached, and it not, then steps 1108 and 1110 (as may be present based on configuration) may be repeated until a predetermined width of a final assembly is complete.

It is to be appreciated that a benefit of the present innovation is that such a final assembly may be easily varied, both at an initial assembly point, as well as at an "in-field" situation to efficiently modify the assembly and provide for variable zones of material removal capability. This contrasts with the present state of the art in which a large and heavy milling drum that is preset would need to be changed out of a larger system in order to affect a change in material removal configuration. The disclosed innovation provides an ability to satisfy multiple material removal widths as well as multiple material removal configurations in a highly efficient manner. For example, an assembly can be quickly modified in the field for removing material from a road with discontinuous road material, from various grades of concrete to asphalt. Further, the assembly can be quickly modified for changing material removal configurations, such as various widths and even multiple cutting zone widths with predetermined zones of no material removal that also can be conveniently assembled or reassembled in the field. An embodiment of one assembly configuration may quickly be modified to another embodiment.

At step 1112, an end cap, for example, Piece 614 of example mandrel 600 of FIG. 6, may be slid onto the shaft. In an alternative embodiment, the end cap may be mounted to the last plate or spacer prior to mounting the last plate or spacer on the mandrel. In other embodiments an endcap may be in addition to a mandrel Piece 614. At step 1114, adhesive and finishing bolts may be used to provide a compression force on the blade elements or blade elements and spacers along the axis of the mandrel. Adhesive may be most any appropriate bolt adhesive, and in a preferred embodiment, Blue LOCTITE® 248 may be used. The compression along with various embodiments of blade to blade locking provides for a compact assembly that replaces the need for large milling drums. At step 1116, after bolts have been installed and tightened, blade shaft nuts may be installed. In an embodiment, the blade shaft nuts may be screwed on, and in some embodiments, double nutting may be preferred. At step 1118, the assembly may be completed with the installation of a cover.

It is to be appreciated that the disclosed innovative method provides an assembly that utilizes pressure from the tightening of the finishing bolts on the end plate, and in some embodiments along with a "spin and lock" mating, to comprise an assembly that eliminates a need for having a dedicated milling drum. The assembly of the disclosed innovation can be easily modified to fit most any drive shaft sizes. The starting labyrinth ring can be configured to mate with most any drive system.

It is to be appreciated that certain embodiments of the innovation include spacers of similar thickness and mounting features as plates, thereby reducing the assembly time, minimizing inventory and handling of spacers, and providing for consistent clamping pressure of the plates or plates and spacers. In other embodiments, spacers of dissimilar thickness are contemplated, as discusses herein.

It is to be further appreciated, that the fixed end and the end plate may be constructed so as to have a multitude of mating features to fit existing machinery involved in material removal. In embodiments, the mating features may include arbor holes. Alternatively or additionally, mating features may include a family of mounting holes or slots to accommodate a variety of field equipment.

With the assembly method, a single field worker may construct or modify a field device much quicker and more efficiently than with current art practices that require a large heavy milling drum.

In accordance with the present innovation, there is provided a milling-drumless system for material removal, comprising means for engaging a drive shaft with a mandrel; means for attaching an abrasive element to each of a plurality of shoulders of a blade element means for configuring a modifiable configuration of at least one of a plurality of a blade elements, and a plurality of blade elements and spacers, to a predetermined configuration attached to the mandrel; and means for holding the modifiable configuration together. The system is provided comprising a where portion of each of the plurality of shoulders of a blade element has a greater thickness than a core portion of a blade element and that the predetermined configuration attached to the mandrel is attached such that an interference zone of one greater thickness shoulder portion of a blade element abuts a greater thickness portion of a successive blade element. The system is provided comprising wherein the at least one of a plurality of blade elements, and a plurality of blade elements and spacers, are configured such that abrasive elements provide a material removal capability across the width of the system. The system is provided comprising wherein the configuration of abrasive elements provide material removal capability at a plurality of radial distances from the centerline of the mandrel. The system is provided comprising wherein the at least one of a plurality of blade elements and a plurality of blade elements and spacers, are configured such that abrasive elements provide a material removal capability across less than the width of the system. The system is provided comprising wherein the configuration of abrasive elements provide material removal capability at a plurality of radial distances from the centerline of the mandrel. The system is provided comprising wherein the at least one of a plurality of blade elements, and a plurality of blade elements and spacers, are configured such that abrasive elements provide a material removal capability of a predetermined plurality of widths and predetermined gaps between the plurality of material removal widths. The system is provided comprising wherein the configuration of abrasive elements provide material removal capability at a plurality of radial distances from the centerline of the mandrel. The system is provided comprising wherein the means for attaching an abrasive element to each of a plurality of shoulders of a blade element permanently attach the abrasive element to each of the respective plurality of shoulders of the respective blade elements. The system is provided comprising wherein at least one of the plurality of blade elements are configured such that abrasive elements per blade element are comprised of alternating configurations of a first and a second configuration, wherein the first configuration comprises two circular abrasive elements aligned at the same radial distance from the mandrel centerline and the second configuration comprises a single circular abrasive element aligned at the same radial distance from the mandrel centerline as the first configuration, and further comprises that a rotation path of a centerline of the single circular abrasive element of the second configuration rotates in the same rotation path as a point equidistant between the centers of the two circular abrasive elements of the first configuration. The system is provided comprising wherein the means for attaching an abrasive element to each of a plurality of shoulders of a blade element detachably attaches the abrasive element to the respective plurality of shoulders of the respective blade elements. The system is provided comprising wherein at least one of the plurality of blade elements are configured such that abrasive elements per blade element are comprised of alternating configurations of a first and a second configuration, wherein the first configuration comprises two circular abrasive elements aligned at the same radial distance from the mandrel centerline and the second configuration comprises a single circular abrasive element aligned at the same radial distance from the mandrel centerline as the first configuration, and further comprises that a rotation path of a centerline of the single circular abrasive element of the second configuration rotates in the same rotation path as a point equidistant between the centers of the two circular abrasive elements of the first configuration.

In accordance with the present innovation, there is provided a milling-drumless system for material removal, comprising a mandrel for engaging a rotary drive, wherein the mandrel comprises a first piece for providing an inner shoulder and an inner cylindrical surface; a labyrinth ring for engaging the mandrel and providing an attachment point to a larger device; and at least one of a plurality of blade elements, and a plurality of blade elements and spacers, wherein each of the plurality of blade elements and spacers have an inner diameter that fits the mandrel cylindrical surface, and wherein each of the plurality of blade elements has a core portion and a plurality of shoulder portions, and wherein the core portion provides a lateral contact surface and the plurality of shoulder portion each has an abrasive element attached such that the rotary motion of the rotary drive moves the abrasive portion and provides a working zone that removes material in which the zone is placed; and wherein the mandrel has an end piece that provides a second interior shoulder and that upon the mandrel pieces being attached, the at least one of a plurality of blade elements and a plurality of blade elements and spacers placed on the mandrel cylindrical surface are held in place with a transverse force.

While emphasis has been placed on the embodiments of the innovation illustrated and described herein, it will be appreciated that other embodiments, and equivalences thereof, can be made and that many changes can be made in the described embodiments without departing from the principles of the innovation. Furthermore, the embodiments described above can be combined to form yet other embodiments of the disclosed innovation. Accordingly, it is to be distinctly understood that the foregoing descriptive matter is to be interpreted merely as illustrative examples of the innovation and not as a limitation. It will be apparent to persons skilled in the art that a number of variations and modifications can be made without departing from the scope of the invention as defined in the claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A milling-drumless system for material removal, said system comprising:
    a mandrel that engages a rotary drive, wherein the mandrel has a cylindrical portion that has a cylindrical mating surface and a mandrel centerline, and has a first end that provides a first interior shoulder;
    a labyrinth ring that engages the mandrel and provides an attachment point to a larger device; and
    a material removal section, wherein the material removal section comprises at least one of either a set of a plurality of blade elements, a set of a plurality of blade elements and spacers, or both,
    wherein the material removal section has an inner diameter that mates to the mandrel cylindrical mating surface, and
    wherein each of the plurality of blade elements has a core portion and at least two shoulder portions, wherein the core portion provides a lateral contact surface, and wherein each shoulder portion has at least one abrasive element attached such that the rotary motion of the mandrel around the mandrel centerline by the rotary drive moves the abrasive element, which provides a working zone that removes material in which the zone is placed; and
    wherein the mandrel has a second end that provides a second interior shoulder;
    wherein a transverse force connects the first interior shoulder, the lateral contact surface of the core portion of each of the plurality of blade elements, and the second interior shoulder, wherein the transverse force holds in place the material removal section; and
    wherein for each blade element of the plurality of blade elements, the blade element is configured such that each blade element has shoulders of a first and of a second alternating configurations, the first configuration having a different number of abrasive elements than the second configuration, and the abrasive elements of the first and second configurations are aligned at a same radial distance from the mandrel centerline and the abrasive elements in a first set of abrasive elements are arranged in a first orientation and the abrasive elements in a second set of abrasive elements are arranged in a second orientation offset from the first orientation such that the abrasive elements of adjacent blade elements along the mandrel centerline overlap around the mandrel centerline.

2. The system of claim 1, wherein for a set of a plurality of blade elements and spacers, a perimeter of the core portion of the blade elements is consistent with an outer diameter of the spacers such that for the set of a plurality of blade elements and spacers, that upon the mandrel pieces being attached, provide a continuous surface that protects the mandrel cylindrical portion.

3. The system of claim 1, wherein a portion of each of the shoulders of the first and of the second alternating configurations has a greater thickness than the core portion of a blade element, and wherein said labyrinth ring and said at least one of either a set of the plurality of blade elements, the set of the plurality of blade elements and spacers, or both, have a predetermined configuration as mounted on the mandrel such that an interference zone of one greater thickness shoulder portion of a blade element abuts a greater thickness portion of a successive blade element.

4. The system of claim 1, wherein the at least one of either a set of the plurality of blade elements, the set of plurality of blade elements and spacers, or both, are configured such that abrasive elements provide a material removal capability across a width of the material removal section.

5. The system of claim 4, wherein the configuration of abrasive elements provide material removal capability at a plurality of radial distances from the mandrel centerline.

6. The system of claim 1, wherein the at least one of either a set of the plurality of blade elements, the set of plurality of blade elements and spacers, or both, are configured such that said at least one abrasive element provides a material removal capability across less than a width of the material removal section.

7. The system of claim 6, wherein the configuration of abrasive elements provide material removal capability at a plurality of radial distances from the mandrel centerline.

8. The system of claim 1, wherein the at least one of either a set of the plurality of blade elements, the set of plurality of blade elements and spacers, or both, are configured such that abrasive elements provide a material removal capability of a predetermined plurality of widths and predetermined gaps between the plurality of material removal widths.

9. The system of claim 1, wherein the at least one of either a set of the plurality of blade elements, the set of plurality of blade elements and spacers, or both, are configured such that abrasive elements are permanently attached to blade elements at a swept back angle relative to a horizontal plane from a top plane of a face of the abrasive element.

10. The system of claim 9, wherein at least one of the plurality of blade elements is configured such that an abrasive element of said respective blade element is comprised of alternating configurations of the first configuration and the second configuration, wherein the first configuration comprises two abrasive elements aligned at the same radial distance from the mandrel centerline and the second configuration comprises a single abrasive element aligned at the same radial distance from the mandrel centerline as the first configuration, and further comprises a rotation path of a centerline of the single abrasive element of the second configuration that rotates in the same rotation path as a point equidistant between the centers of the two circular abrasive elements of the first configuration.

11. The system of claim 1, wherein the at least one of either a set of plurality of blade elements, the set of plurality of blade elements and spacers, or both, are configured such that abrasive elements are detachably attached to said blade elements at a swept back angle relative to a horizontal plane from a top plane of a face of the abrasive element.

12. The system of claim 11, wherein at least one of the plurality of blade elements is configured such that abrasive elements per blade element are comprised of alternating configurations of the first and the second configuration, wherein the first configuration comprises two abrasive elements aligned at the same radial distance from the mandrel centerline and the second configuration comprises a single abrasive element aligned at the same radial distance from the mandrel centerline as the first configuration, and further comprises that a rotation path of the single abrasive element of the second configuration rotates in the same rotation path as a point equidistant between the centers of the two circular abrasive elements of the first configuration.

13. The system of claim 1, wherein each abrasive element of said at least one abrasive element comprises a shape selected from the group consisting of round, rectangular, square, triangular, polygonal, oval and truncated circular, and wherein each abrasive element of said at least one abrasive element are either all the same shape or are of different shapes.

14. A method of fabricating a milling-drum-less head assembly for material removal comprising:
engaging a first end portion of a mandrel to a labyrinth ring, wherein the labyrinth ring is sized to engage a drive shaft and provides an attachment point to a larger device,
wherein the mandrel has a cylindrical portion that has a cylindrical mating surface and a mandrel centerline, and the mandrel engages a keyway of the drive shaft, and
wherein the mandrel comprises a first mandrel shoulder portion at the first end portion, the first mandrel shoulder portion providing a mandrel contact zone for a first lateral portion of a first of at least two of a plurality of blade elements or a plurality of blade elements and spacers, wherein the at least two of a plurality of blade elements or a plurality of blade elements and spacers each has a first lateral portion and an opposing second lateral portion, and the cylindrical mating surface mates with an inner diameter of the at least two of a plurality of blade elements or a plurality of blade elements and spacers,
placing, in a predetermined order and number, the first of the at least two of a plurality of blade elements or a plurality of blade elements and spacers onto the mandrel cylindrical portion with the first lateral portion of the at least two of a plurality of blade elements or a plurality of blade elements and spacers contacting the mandrel contact zone, and for each of the remaining at least two of a plurality of blade elements or blade elements and spacers being placed in the predetermined order and number placed onto the mandrel cylindrical portion, a successive first lateral portion mates with a previous second lateral portion of a previous placed plurality of blade elements or a plurality of blade elements and spacers,
wherein for each blade element of the plurality of blade elements, the blade element is configured such that each blade element has shoulders of a first and of a second alternating configurations, the first configuration has a different number of abrasive elements than the second configuration, the abrasive elements of adjacent blade elements along the mandrel centerline overlap around the mandrel centerline, and the abrasive elements of the first and second configurations are aligned at a same radial distance from the mandrel centerline; and
attaching an end piece of the mandrel to the mandrel cylindrical portion, wherein the end piece of the mandrel engages the keyway of the drive shaft, the end piece providing a second mandrel shoulder portion that contacts the lateral portion of the last predetermined number, and wherein the attached end piece of the mandrel provides a transverse force parallel to the mandrel centerline,
wherein the predetermined order and number provides a non-symmetrical arrangement across the mandrel centerline.

15. The method of claim 14, wherein each of the plurality of blade elements has a core portion wherein the core portion provides the first lateral portion and the opposing second lateral portion, wherein a rotary motion of a rotary drive moves the abrasive elements of the first and the second alternating configurations and provides a working zone for removing material in which the zone is placed.

16. The method of claim 14, wherein the lateral portions of the blade elements and blade elements and spacers create a core zone wherein an outer perimeter of the core zone has full contact across the material removal section.

17. The method of claim 14, wherein for the placing, in the predetermined order and number, a further step comprising:

following a first placing of the at least one of the plurality of blade elements or the plurality of blade elements and spacers onto the mandrel cylindrical portion and upon the placement of a successive blade element, rotating the successive blade element around an axis of the cylindrical portion of the mandrel until contact of an interference zone between the two blade elements of the first and successive blade elements is made, wherein the contacting interference zone provides a spin-lock that assists in maintaining the orientation of the subset of the predetermined number and order.

18. The method of claim 14, wherein the steps of:
placing, in the predetermined order and number, and attaching the end piece of the mandrel,
precede the step of engaging the first end portion of the mandrel to the labyrinth ring, the labyrinth ring being sized to engage the drive shaft and provide the attachment point to the larger device.

19. A manufacture for use in a material removal system, comprising:
a plurality of blade elements configured such that a plurality of abrasive elements per blade element are comprised of alternating configurations of a first and a second configuration,
wherein the first configuration comprises at least two abrasive elements aligned along a centerline of the blade element and wherein the second configuration comprises at least one abrasive element aligned at a same radial distance from the blade element centerline as the first configuration,
a rotation path of the at least one abrasive element of the second configuration about the blade element centerline rotates in the same rotation path as a point equidistant between centers of the at least two abrasive elements of the first configuration, and
the abrasive elements of adjacent blade elements along the blade element centerline overlap along respective rotation paths about the blade element centerline.

20. The manufacture for use in a material removal system according to claim 19, wherein the second configuration comprises a single abrasive element aligned at the same radial distance from the blade element centerline as the first configuration, and the first configuration and the second configuration comprise different numbers of abrasive elements.

21. The manufacture according to claim 19, wherein each abrasive element in the plurality of abrasive elements comprises a material being polycrystalline diamond (PCD).

22. The manufacture according to claim 19, wherein said manufacture is configured for use with a milling-drumless system for material removal according to claim 1.

23. The manufacture according to claim 19, wherein each of the plurality of blade elements includes a core portion and a shoulder portion, and for each respective blade element fixed to the first configuration of abrasive elements:
the at least two abrasive elements are attached to the same shoulder portion such that rotary motion of the plurality of blade elements moves the at least two abrasive elements as twin abrasives and provides a working zone that removes material in which the working zone is placed, and
a portion of the shoulder has a greater thickness than the core portion along the centerline.

* * * * *